United States Patent
Hill

(10) Patent No.: US 10,476,912 B2
(45) Date of Patent: Nov. 12, 2019

(54) CREATING, VISUALIZING, AND SIMULATING A THREAT BASED WHITELISTING SECURITY POLICY AND SECURITY ZONES FOR NETWORKS

(71) Applicant: Veracity Security Intelligence, Inc., Aliso Viejo, CA (US)

(72) Inventor: Roger Hill, Aliso Viejo, CA (US)

(73) Assignee: VERACITY SECURITY INTELLIGENCE, INC., Aliso Viejo, CA (US)

(*) Notice: Subject to any disclaimer, the term of this patent is extended or adjusted under 35 U.S.C. 154(b) by 117 days.

(21) Appl. No.: 15/708,019

(22) Filed: Sep. 18, 2017

(65) Prior Publication Data

US 2019/0089742 A1    Mar. 21, 2019

(51) Int. Cl.
| | |
|---|---|
| *H04L 29/06* | (2006.01) |
| *G06F 3/0484* | (2013.01) |
| *H04L 12/24* | (2006.01) |
| *G06F 3/0482* | (2013.01) |
| *G06F 3/0486* | (2013.01) |
| *H04L 29/08* | (2006.01) |
| *G06F 21/55* | (2013.01) |

(52) U.S. Cl.
CPC ........... *H04L 63/20* (2013.01); *G06F 3/0482* (2013.01); *G06F 3/0484* (2013.01); *G06F 3/0486* (2013.01); *H04L 41/0893* (2013.01); *H04L 41/12* (2013.01); *H04L 41/22* (2013.01); *H04L 41/28* (2013.01); *H04L 63/0209* (2013.01); *H04L 63/101* (2013.01); *H04L 63/104* (2013.01); *H04L 63/105* (2013.01); *H04L 63/1433* (2013.01); *H04L 63/1441* (2013.01); *H04L 67/12* (2013.01); *G06F 21/552* (2013.01)

(58) Field of Classification Search
CPC ............... H04L 63/0209; H04L 63/104; H04L 41/0893; H04L 41/22; H04L 41/28; G06F 3/0486
See application file for complete search history.

(56) References Cited

U.S. PATENT DOCUMENTS

| | | | |
|---|---|---|---|
| 6,178,244 B1* | 1/2001 | Takeda | H04L 9/0822 380/259 |
| 2015/0143268 A1* | 5/2015 | Retlich | G05B 23/0216 715/763 |

(Continued)

FOREIGN PATENT DOCUMENTS

| | | |
|---|---|---|
| EP | 1645926 | 4/2006 |
| EP | 2775685 | 9/2014 |

OTHER PUBLICATIONS

Mahan et al., "Secure Data Transfer Guidance for Industrial Control and SCADA Systems", 37 pages (Year: 2011).*

(Continued)

*Primary Examiner* — Thaddeus J Plecha
(74) *Attorney, Agent, or Firm* — Sheppard, Mullin, Richter & Hampton LLP

(57) ABSTRACT

Techniques described herein are directed toward creating, visualizing, and simulating a threat based whitelisting security policy and security zones for networks. The disclosed technology may be implemented by providing a graphical user interface (GUI) on a network orchestration and security platform that facilitates creation and visualization of security zones and security policies for networks.

18 Claims, 28 Drawing Sheets

(56) References Cited

U.S. PATENT DOCUMENTS

2016/0149863 A1* 5/2016 Walker .................... H04L 29/00
                                                            726/1
2017/0214717 A1   7/2017 Bush
2017/0295141 A1* 10/2017 Thubert .............. H04L 63/0272
2017/0357801 A1* 12/2017 Sanchez ............. H04L 63/0209

OTHER PUBLICATIONS

International Search Report and Written Opinion dated Dec. 13, 2018 for International Application No. PCT/US2018/051396, filed Sep. 17, 2018.

\* cited by examiner

DEFCON 5

| ASSETS | WHITEFLOW DIRECTIVES |
|---|---|
| PLC, IED | GOOSE [ALLOW] |
| PLC, SCADA SERVER 1 | FTP, ETHERNETIP, HTTP [ALLOW] |
| SCADA SERVER 1, SCADA WEB SERVER | RPC [ALLOW] |
| SCADA SERVER 2, RTU | Modbus TCP [ALLOW] |
| IED, HMI | DNP 3 [ALLOW] |

DEFCON 1

| ASSETS | WHITEFLOW DIRECTIVES |
|---|---|
| PLC, IED | GOOSE [ALLOW] |
| PLC, SCADA SERVER 1 | ETHERNETIP [ALLOW] |
| SCADA SERVER 2, RTU | Modbus TCP [ALLOW] |
| IED, HMI | DNP 3 [ALLOW] |

CREATING, VISUALIZING, AND SIMULATING A THREAT BASED WHITELISTING SECURITY POLICY AND SECURITY ZONES FOR NETWORKS

DESCRIPTION OF THE RELATED ART

Industrial control system (ICS) networks provide hardware and software that monitors and controls the operation of machinery and other devices in industrial environments. ICS networks are prevalent in a multitude of industries such as in electrical, manufacturing, oil, gas, water, building automation, chemical, etc.

ICS networks have a variety of differences with conventional IT networks within an enterprise. The lifecycle of devices within industrial networks is typically twelve to twenty years and includes a multitude of legacy devices used in combination with new devices. Additionally, the communication characteristics of the devices are deterministic, device sessions can last years, devices are provided by a multitude of different vendors, and the devices use industrial protocols. For example, the characteristics of machine-to-machine (M2M) communication of devices within these ICS networks may not change for many, many years.

One major issue with ICS is the lack of security controls that protect East/West Network traffic. Conventional network cybersecurity policy and controls for ICS networks are focused on segmentation and firewall deployments. The implementation of a firewall is usually deployed to create an industrial DMZ. This DMZ is typically used for devices that act as a go-between for supplying data from the process to higher level systems. The concentration of these security measures are focused on blocking the North/South traffic. Indeed, most standards bodies and regulations for these ICS systems focus on a "security onion" model of defense in depth. However, in ICS networks North/South communication represents less than 5% of the total traffic.

Another major issue with ICS is the lack of audits of existing security controls required to determine their overall effectiveness The typical firewall configuration approach for network security policy uses a table layout that lists the source host, source port, destination host, destination port and what the action rule is. These processing rules can become lengthy and complex. To demonstrate the complexity of firewall configuration, this field has become a specialty where people are dedicated to only configuring these complex rule sets. For ICS this complexity is magnified due to the "high availability" system requirements. Far too many systems have had "emergency" changes made to firewalls in order to allow traffic due to some immediate operational need. In many cases, these temporary changes are made permanent.

Yet another major issue with ICS is that ICS network security policy stakeholders have no way to visualize the effect of proposed rule changes to an ICS network. ICS security controls for industrial networks typically include firewalls, network segmentation and access control lists (ACL). Each one of these controls require subject matter experts (SMEs) to setup their implementation, as well as the configuration of the ICS network that is being protected. The configuration approach for these controls is typically within a table-like configuration that is broken down into rows, with each row consisting of a source, destination and appropriate action. Each vendor of these tools has a different approach to the setup of these processing rules as well as the processing order.

SUMMARY

Techniques described herein are directed toward creating, visualizing, and simulating a threat based whitelisting security policy and security zones for networks.

In one embodiment, a method includes: initializing an application including a graphical user interface for editing and visually representing security zones of a network, where the network includes a plurality of assets; displaying, on the graphical user interface, a visual representation of a first security zone of the network, where the first security zone includes a first set of assets of the plurality of assets; receiving data corresponding to user input at the graphical user interface editing the first security zone; and in response to receiving the data, editing the first security zone.

In one implementation, the visual representation of the security zone is a logical container of the at least two or more of the plurality of assets.

In one implementation, the network is an industrial network and the plurality of assets include industrial devices.

In one implementation, the network includes a controller communicatively coupled to a plurality of forwarding devices, and each of the plurality of assets is communicatively coupled to a respective port of one of the plurality of forwarding devices.

In one implementation, the user input at the graphical user interface editing the first security zone includes at least one of: moving a visual representation of one of the plurality of assets into the logical container of the first security zone or moving a visual representation of one of the assets from the logical container of the first security zone into a logical container of a second security zone of the network.

In one implementation, the user input at the graphical user interface editing the first security zones includes dragging a visual representation of an asset not assigned to a security zone into the logical container of the first security zone.

In one implementation, the user input at the graphical user interface editing the first security zones include dragging a visual representation of one of the assets from the logical container of the first security zone into a logical container of a second security zone of the network.

In one implementation, the method further includes generating the first security zone, where the first security zone is generated based at least in part on a type of protocol communication between assets in the first set of assets.

In one embodiment, an industrial network system includes: a controller; a plurality of forwarding devices communicatively coupled to the controller over an industrial network; a plurality of assets, where each of the plurality of assets is communicatively coupled to a respective port of one of the plurality of forwarding devices; and a non-transitory computer readable medium having instructions stored thereon that, when executed by a processor, causes the system to: initialize an application including a graphical user interface for editing and visually representing security zones of the industrial network; display, on the graphical user interface, a visual representation of a first security zone of the network, where the first security zone includes a first set of assets of the plurality of assets; receive data corresponding to user input at the graphical user interface editing the first security zone; and in response to receiving the data, editing the first security zone.

In one embodiment, a method includes: identifying a plurality of communication flows between a plurality of assets on a network; applying whiteflow directives to the plurality of communication flows to create a first whitelisting policy; assigning the created first whitelisting policy to a first threat state level; creating a second whitelisting policy, where the second whitelisting policy includes a subset of the whiteflow directives of the first whitelisting policy; and assigning the created second whitelisting policy to a second threat state level.

In one implementation, creating the second whitelisting policy includes loading the first whitelisting policy and removing whiteflow directives from the first whitelisting policy.

In one implementation, the method further includes: storing the first whitelisting policy and the second whitelisting policy in a datastore.

In one implementation, the method further includes: initializing an application including a graphical user interface for displaying and editing whiteflow directives.

In one implementation, the method further includes: displaying a network map on the graphical user interface, the network map visually displaying communication links between the plurality of assets on the network.

In one implementation, applying whiteflow directives to the plurality of communication flows to create the first whitelisting policy includes: receiving data corresponding to user input at the graphical user interface selecting an asset on the network map; and displaying rules for generating whiteflow directives corresponding to the selected asset.

In one implementation, applying whiteflow directives to the plurality of communication flows to create the first whitelisting policy includes: receiving data corresponding to user input at the graphical user interface selecting a communication link on the network map; and displaying rules for generating a whiteflow directive corresponding to the selected communication link.

In one implementation, the network is an industrial network and the plurality of assets includes industrial devices.

In one implementation, the network includes a controller communicatively coupled to a plurality of forwarding devices, wherein each of the plurality of assets is communicatively coupled to a respective port of one of the plurality of forwarding devices.

In one implementation, the method further includes: initializing an application includes a graphical user interface for displaying and editing whiteflow directives; displaying a network map on the graphical user interface, the network map visually displaying ports of the forwarding devices; receiving data corresponding to user input at the graphical user interface selecting a port on the network map; and displaying rules for generating a whiteflow directive corresponding to the selected port.

In one embodiment, a method includes: initializing an application including a graphical user interface for displaying and editing whiteflow directives; generating a logical network map of a plurality of assets on a network, where the logical network map includes the plurality of assets and one or more conversation links between the plurality of assets; displaying the logical network map on the graphical user interface; receiving data corresponding to user input at the graphical user interface selecting an asset or a conversation link on the logical network map; and displaying rules for generating a whiteflow directive corresponding to the selected asset or the selected conversation link.

In one implementation, the network is an industrial network and the plurality of assets includes industrial devices.

In one implementation, the network includes: a controller communicatively coupled to a plurality of forwarding devices, where each of the plurality of assets is communicatively coupled to a respective port of one of the plurality of forwarding devices.

In one implementation, the method further includes: characterizing and classifying the plurality of assets, where characterizing and classifying the plurality of assets includes identifying the plurality of assets and identifying the protocols or protocol behaviors of communications taking place between the plurality of assets.

In one implementation, each of the one or more conversation links between the plurality of assets corresponds to a conversation between two assets using a particular protocol or protocol behavior.

In one implementation, the rules include a decision to drop a conversation link between assets, a decision to deny a conversation link between assets, and a decision to allow a conversation link between assets.

In one implementation, the rules further include a decision to encrypt a conversation link between assets.

In one embodiment, an industrial network system includes: a controller; a plurality of forwarding devices communicatively coupled to the controller over an industrial network; a plurality of assets, wherein each of the plurality of assets is communicatively coupled to a respective port of one of the plurality of forwarding devices; and a non-transitory computer-readable medium having instructions stored thereon that, when executed by a processor, causes the system to: initialize an application include a graphical user interface for displaying and editing whiteflow directives; generate a network map of the industrial network; display the network map on the graphical user interface; receive data corresponding to user input at the graphical user interface selecting a component of the network map; and display rules for generating a whiteflow directive corresponding to the selected component.

In one implementation, the network map includes a logical network map of the plurality of assets, wherein the logical network map includes the plurality of assets and one or more conversation links between the plurality of assets, and wherein the selected component is one of the plurality of assets or one of the one or more conversation links.

In one implementation, the network map includes a physical network map of the plurality of assets, where the physical network map graphically displays connections between forwarding devices on the industrial network, where the selected component includes a port of one of the forwarding devices.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

DETAILED DESCRIPTION

Figure 1A:
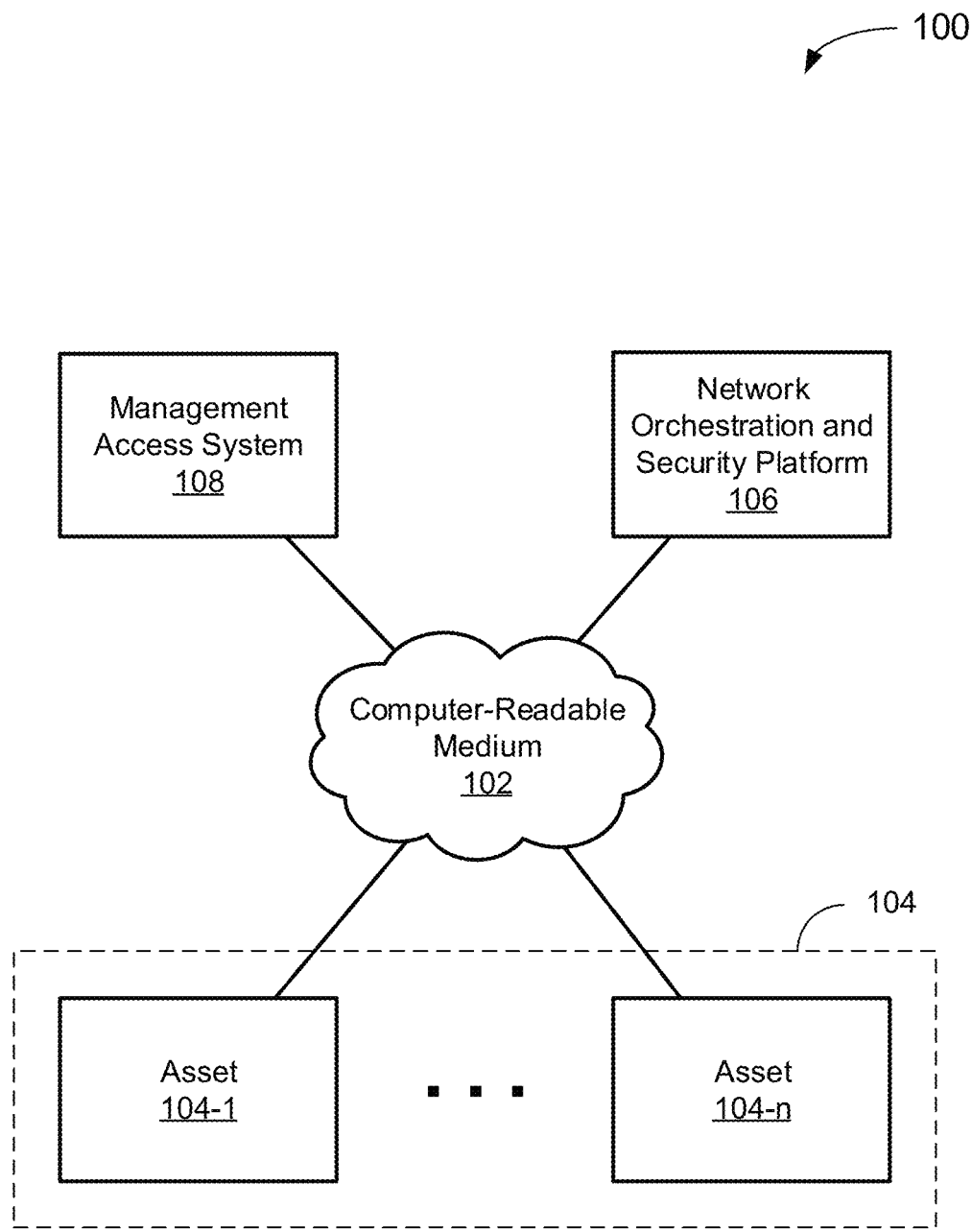
FIG. 1A depicts a diagram of an example of a network orchestration and security platform environment.

As used herein, the term "asset" refers to a device in a network (e.g., an industrial network), a service offered by a device in a network, or some combination thereof. Assets may include, for example, active directories, batch servers, batch clients, data concentrators, engineering workstations, FTP servers, historians, historian web servers, human machine interfaces (HMI), intelligent electronic devices (IED), man machine interfaces (MMI), motion controllers, programmable automation controllers (PAC), programmable logic controls (PLC), phasor measurement units (PMU), remote terminal units (RTU), supervisory control and data acquisition (SCADA) systems such as SCADA servers, SCADA clients, SCADA web servers, SCADA web clients, synchrophasors, web servers, and other devices and/or services used in networks.

As used herein, the term "security zone" refers to a logical grouping of assets by trust. In some implementations, the term "security zone" may also refer to a logical grouping of assets by trust and cohesive function. Communications between assets within the same security zone may be considered by default to have a higher level of trust than communications between assets across security zones.

As used herein, the term "whiteflow directive" refers to what communication is permitted between two assets that communicate. As used herein, the term "whitelisting policy" refers to a collection of whiteflow directives. In one implementation, the whitelisting policy may be a collection of all whiteflow directives on a network. Alternatively, a whitelisting policy may be a collection of all whiteflow directives on a portion of a network (e.g., a collection of whiteflow directives in a security zone or a collection of whiteflow directives for one asset).

As used herein, the term "threat state level" refers to an indication of a defensive posture for cybersecurity in a network. Each threat state level is assigned a whitelisting policy. A threat state level that is higher than another threat state level on the same network or subnetwork has a more restrictive whitelisting policy (i.e., is more restrictive as to what communications are permitted between assets). The number of threat state levels can range from two to some other desired value.

As used herein, the term "DEFCON levels" is an example of threat state levels. There are five DEFCON levels, which is a number of threat state levels due to the use of the acronym by the United States Armed Forces.

In a Software-Defined Networking (SDN)-implementation, the term "controller" generally refers to a logically centralized entity that determines how packets or frames should be forwarded in a network and communicates this forwarding information to forwarding devices that forward packets or frames to assets. Definition as a logically centralized entity neither prescribes nor precludes implementation in a distributed form, nor details such as the federation of multiple controllers, the hierarchical connection of controllers, communication interfaces between controllers, nor virtualization or slicing of network resources. In a particular implementation, a controller may be implemented in accordance with Issue 1.1 of "SDN Architecture" as prescribed by the Open Networking Foundation (Document ONF TR-521).

In an SDN-implementation, a "forwarding device" refers to a networked device (e.g., a switch, router, gateway, or access point) that forwards packets or frames to assets or other forwarding devices based on forwarding information received from a controller.

As noted above, conventional industrial networks lack security controls that protect East/West network traffic, lack audits of existing security controls required to determine their overall effectiveness, and do not provide a way to visualize the effect of proposed rule changes to an industrial network. Embodiments of the technology disclosed herein are directed toward addressing these problems by creating, visualizing, and simulating a threat based whitelisting security policy and security zones for networks. As further described below, the disclosed technology may be implemented by providing a graphical user interface (GUI) on a network orchestration and security platform that facilitates creation and visualization of security zones and security policies for networks. As humans are very visual by nature, the disclosed technology may permit a user of a network orchestration and security platform to intuitively monitor and analyze communication flows for every asset on the network. Additionally, the disclosed technology may reduce the complexity and high level of skill required to develop network security configurations.

FIG. 1 depicts a diagram 100 of an example of a network orchestration and security platform environment. The diagram 100 includes a computer-readable medium 102, assets 104-1 to 104-n (referred to collectively herein as "assets 104") coupled to the computer-readable medium 102, a network orchestration and security platform 106 coupled to the computer-readable medium 102, and a management access system 108 coupled to the computer-readable medium 102.

The computer-readable medium 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 and other computer readable mediums discussed in this paper are intended to represent a variety of potentially applicable technologies. For example, the computer-readable medium 102 can be used to form a network or part of a network that includes assets operating at multiple conceptual levels (using naming conventions of the Purdue Reference Model for Control Hierarchy logical framework (ISA99 Committee, 2004)): Level 0—physical process, Level 1—basic control, Level 2—area supervisory control, Level 3—site manufacturing operations and control systems, Level 4—site business planning and logistics, Level 5—enterprise. Where two components are co-located on an asset, the computer-readable medium 102 can include a bus or other data conduit or plane. Where a first component is co-located on one asset and a second component is located on a different asset, the computer-readable medium 102 can include a wireless or wired back-end network or LAN. The computer-readable medium 102 can also encompass a relevant portion of a WAN or other network, if applicable.

The assets, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Referring once again to the example of FIG. 1, the assets 104 are intended to represent a network of assets and infrastructure under the control of an entity. In a specific implementation, the network is an industrial network, but some other applicable personal or enterprise network is possible. The network will also include infrastructure, which can generally be conceptualized as the part of the computer-readable medium 102 that is under the control of the applicable entity or on the edge of the network. In a specific implementation, the assets 104 include wired or wireless interfaces through which the assets 104 can send and receive data to and from the computer-readable medium 102. The assets 104 function to transmit data between sources and destinations that may be in or outside the network.

The assets 104 may or may not include unique identifiers that can be used in the transmission of data. Unique identifiers of the assets 104 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. In particular implementations, further described below, the assets 104 may be assigned a unique ID by the network orchestration and security platform 106.

Depending upon implementation-specific or other considerations, the assets 104 can include applicable communication interfaces for receiving and sending data according to an applicable wireless device protocol. Examples of applicable wireless device protocols include Wi-Fi, ZigBee®, Bluetooth®, and other applicable low-power communication standards. In a specific implementation, the network devices act as stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-

1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the assets 104 are configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In the example of FIG. 1, the network orchestration and security platform 106 is intended to represent a platform that has been designed to simplify network design, deployment, configuration, and orchestration for networks, such as industrial control networks. In a specific implementation, the network orchestration and security platform 106 integrates network security concepts into a unified system for providing comprehensive situational awareness. The unified system and comprehensive situation awareness yields improved overall efficiency of configuration tasks, providing prevention and protection controls applicable across various network segments, and integration of support for incident response personnel. For example, the network orchestration and security platform 106 can provide visibility into what devices are on a network as well as what conversations are taking place (e.g., M2M communications) and using which languages (network protocols) and information related thereto is logged for historical access. The network orchestration and security platform 106 can leverage Software Defined Networking (SDN) and incorporate features such as Network Segmentation, Security Zones, Whitelisting Security Policy, and Threat State Modeling. SDN devices, such as SDN applications, SDN controllers, SDN forwarding devices, SDN Control to Data-Plane Interfaces (CDPI), and SDN NorthBound Interfaces (NBI) to name several. In a specific implementation, the solution is applied to industrial network configuration and management, although techniques described in this paper may be applicable to other types of networks.

In a specific implementation, the network orchestration and security platform 106 functions to generate security zones including ICS assets that are in the six levels of the Purdue Reference Model for Control Hierarchy logical framework (ISA99 Committee, 2004). For example, security zones may be generated for motors, flow meters, and sensors (representative examples of Level 0 devices of the Purdue Reference Model), PLCs (representative examples of Level 1 devices of the Purdue Reference Model), SCADA systems or HMIs (representative examples of Level 2 devices of the Purdue Reference Model), historians, Manufacturing Execution Systems (MES), or Operations Management Systems (MOS) (representative examples of Level 3 devices of the Purdue Reference Model), devices that facilitate management of business-related activities of a manufacturing operation (representative examples of Level 4 devices of the Purdue Reference Model), devices that facilitate corporate IT infrastructure systems and applications (representative examples of Level 5 devices of the Purdue Reference Model) or the like. Devices of a given level can generally communicate with devices only one level down and only one level up. The security zones may be visually represented as a logical container of assets whose function is related to the automation of a related physical process. For example, the infeed process for a chemical facility would have an automated system for the delivery of raw product from rail cars and trucks and unloading of the dry product to storage silos and to batch tanks for wet product. In a specific implementation, the security zones define a logical grouping of trust and have policy rules that can be applied to determine what communication is allowed (e.g., what M2M communications are permitted) and by what languages these conversations should be permitted (e.g., what network protocols).

In a specific implementation, the network orchestration and security platform 106 is implemented, at least in part, through a local agent on a network having all subnetworks under common administrative control, generally referred to as, e.g., an enterprise network or a home network. A local agent, as used in this paper, is implemented on a physical device locally coupled to at least one of the assets 104. Depending upon implementation or other considerations, the network orchestration and security platform 106 can be implemented as part of a private cloud. A private cloud implementing the network orchestration and security platform 106, at least in part, can be specific to an entity. The network orchestration and security platform 106 may or may not be a dedicated platform for a single public or private network, though that is a likely implementation given the desire by enterprises to maintain control of their respective networks. However, some aspects of the network orchestration and security platform 106 could provide services to multiple networks not under common administrative control, while other aspects could be offered only to a specifically-identified network under the administrative control of the applicable entity.

In the example of FIG. 1, the management access system 108 is intended to represent one or more devices (e.g., a workstation, a laptop, a smartphone, etc.) through which agents communicate with the network orchestration and security platform 106. Agents can be human or artificial and will generally have Create, Read, Update, Delete (CRUD) rights to all or a subset of data associated with an applicable network or subnetwork. Such rights can be used to access data and to provide commands (the equivalent of, e.g., updating an instruction set) to assets to change asset behavior or drop asset communications from the network.

In a specific implementation, a portion of the management access system 108 is implemented remote from the network devices 104 and the network orchestration and security platform 106. Depending upon implementation-specific or other considerations, portions of the management access system 108 can transmit and receive data to and from the enterprise network through virtual private network (hereinafter "VPN") tunnels. For example, the management access system 108 may be capable of receiving outbound network traffic sent from the network devices 104 or the network orchestration and security platform 106 over a VPN tunnel. In a specific example, VPN tunnels through which the management access system 108 send and receive data are maintained using dedicated networking equipment, such as dedicated routers.

In an example of operation of the example system shown in FIG. 1, the assets 104 and at least a portion of the computer-readable medium 102 form, e.g., an industrial network. The network orchestration and security platform 106—or local agents associated therewith that are also part of the industrial network—provides data to and receives instructions from the management access system 108. In an example of operation, the system provides a visually-based security policy development approach for industrial networks, which enables, for example, the management access system 108 to provide a graphical representation of security zones enabling a simplified drag-and-drop operation of assets from one zone to the next by the administrator. This workflow involves an administrator viewing a logical network topology of assets of the system and observed conversations between assets. The administrator can select the conversation link between assets and select an appropriate action: Allow, Drop (conversation will not be allowed and no deny response is provided to sender), or Alert (allow but generate an alert anytime that conversation is observed.

Continuing the example, a real-time peer review cycle is incorporated for configuration workflows. This peer review mechanism includes a list of stakeholders for the configuration that allows for real-time notification when a change is made and is then ready for review. Via the management access system 108, a peer (team member) can access a first (e.g., original, old, previous, or current) network configuration, the proposed change, who proposed the change, and the reason for the change. The data can be presented graphically, which is of particular value for the network configuration and proposed changes because they can be presented in association with the security zone paradigm. The peer (team member) can than accept the change or deny the change and provide the reason for denial. This approach increases the efficiency of the network configuration and security design process tremendously.

In a specific implementation, a security policy is not defined for all threat levels and threat vectors. Rather, a threat state model resembles the defense readiness model of the US Military, DEFCON, made applicable to security measures for, e.g., an industrial network that controls a physical process. By adopting this type of methodology, the security for a site becomes agile and adaptable to the threat state of the system or site. This approach can provide a reduction in autonomous attack surface of the industrial control system. Thus, when the threat is nonexistent (DEFCON 5), the maximum functionality and connectivity can be realized. Yet, when there is a direct threat against the system the system can ensure the mission critical function of the process is insured at an appropriate level (DEFCON 4, 3, 2, or 1) to define an associated defensive posture for cybersecurity. This is accomplished by defining the security zones within a security zone management application of the network orchestration and security platform 106. A next workflow is defining the Whitelisting policy by designing each WhiteFlow Directive within the unique visualization approach. The combination of the security zones plus the Whitelisting policy is then assigned to a threat state (e.g. DEFCON 5). When an administrator wants to configure the Whitelisting policy for the next elevated threat state, which in this example is DEFCON 4, the DEFCON 5 visualization is provided via the management access system 108 as a starting point. The concept is that the Whitelisting policy becomes more and more restrictive with each threat-state DEFCON level. The incorporation of threat indicators and threat intelligence can be fed into a model to define recommended actions via the management access system 108. The actual definition of each DEFCON threat state is predefined during configuration and can be integrated into a Disaster Recovery Process (DRP) at the network orchestration and security platform 106.

As an administrator configures the Whitelisting policy, the policy is tested in a simulated environment to test for any violations or indications of adverse reactions by the system. For example, a first test can be a simulation test. After the simulation test, the policy is submitted to the peer review team for approval. Once approval has been granted, the system is still not permitted to execute the policy in a protective state. Each of the Whitelisting rules are converted to a special type of "alert only" rule that provides a permissive rule environment while evaluating any possible adverse reactions prior to their acceptance as a protective policy.

Figure 1B:
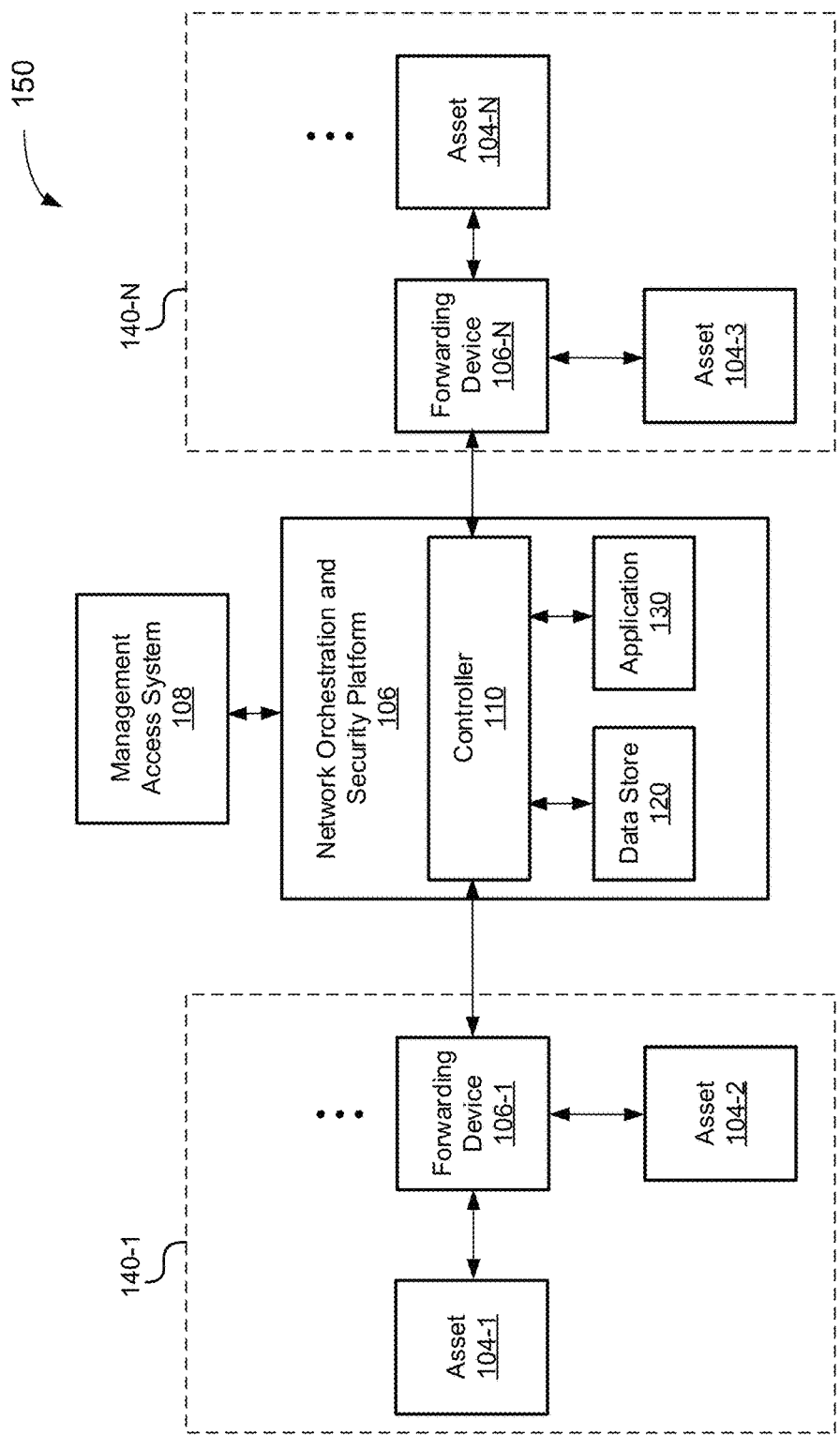
FIG. 1B illustrates an example networking system that leverages software-defined networking in accordance with a particular implementation to provide network orchestration and security.

FIG. 1B illustrates an example networking system 150 that leverages software-defined networking in accordance with a particular implementation to provide network orchestration and security. System 150 comprises assets 104, forwarding devices 106-1 to 106-N (referred to collectively herein as forwarding devices "106"), a management access system 108, and a network orchestration and security platform 106 including controller 110, data store 120, and application 130. In this implementation, software-defined networking may be leveraged to simplify network design, deployment, configuration, and orchestration for a network such as an industrial control network.

Assets 104 are connected to a forwarding device 106 that is connected via a secure command channel to controller 110 (i.e., transport layer security is established between forwarding device 106 and controller 110). Controller 110 may communicate with forwarding devices 106 using any suitable protocol known in the art (e.g., OpenFlow, OVSDB, etc.) In this implementation, controller 110 may be used to maintain a centralized view of the entire network infrastructure, including assets 104-1 to 104-N, conversations taking place between assets 104-1 to 104-N, the protocols/protocol behaviors of conversations taking place between assets 104-1 to 104-N, and forwarding devices 106-1 to 106-N. In implementations, controller 110 is implemented as an application executed on a server.

Controller 110 identifies communication flows on the network, determines how packets or frames should be forwarded in a network, and communicates this forwarding information to forwarding devices 106. This forwarding information (e.g., fowarding rules/configuration) may be sent using a secure command channel (e.g. OpenFlow). As further described below, this functionality may be implemented by applying a whiteflow directive to each communication flow on the network, which may be used to determine which assets are allowed to communicate and what the permitted protocols and protocol behaviors are between the assets. The collection of whiteflow directives on the network may be stored as a whitelist policy that is assigned a threat state level. Additionally, controller 110 may be used to assign security zones 140-1 to 140-N (referred to collectively herein as security zones "140") which may be used to create a logical grouping of trust of assets 104.

Data store 120 may store information associated with assets on the network (e.g., asset type, asset vendor, asset level (e.g., under the Purdue Model), asset IP address, asset MAC address, asset protocols/protocol behaviors, etc.), information associated with forwarding devices on the network (e.g., forwarding device ID, forwarding device port information, etc.), whitelisting policies, security zone information, a historical log of all communications that take place between assets, a historical log of all assets and forwarding devices that have been on the network, user logs of changes made to assets, application audit logs, and other information.

Application 130, when executed, may provide an interface for devices of management access system 108 to use the controller to manage device behavior on the network. In various implementations further described below, application 130 may provide a graphical user interface for visualizing, editing, and tracking assets, security zones, whiteflow directives, whiteflow policies, network maps (e.g., logical and physical network maps), and other information on the network. Although illustrated in FIG. 1B as being a component of network orchestration and security platform 106, in some embodiments application 130 may be a component of a management access system 108.

FIGS. 2-5 illustrate an example of a high level workflow using a forwarding device deployment model to create a scalable network such as an industrial network. Techniques described herein will primarily described with reference to industrial networks, however one having ordinary skill in the art would appreciate that in some instances these techniques may be applied to other types of networks.

Figure 2:
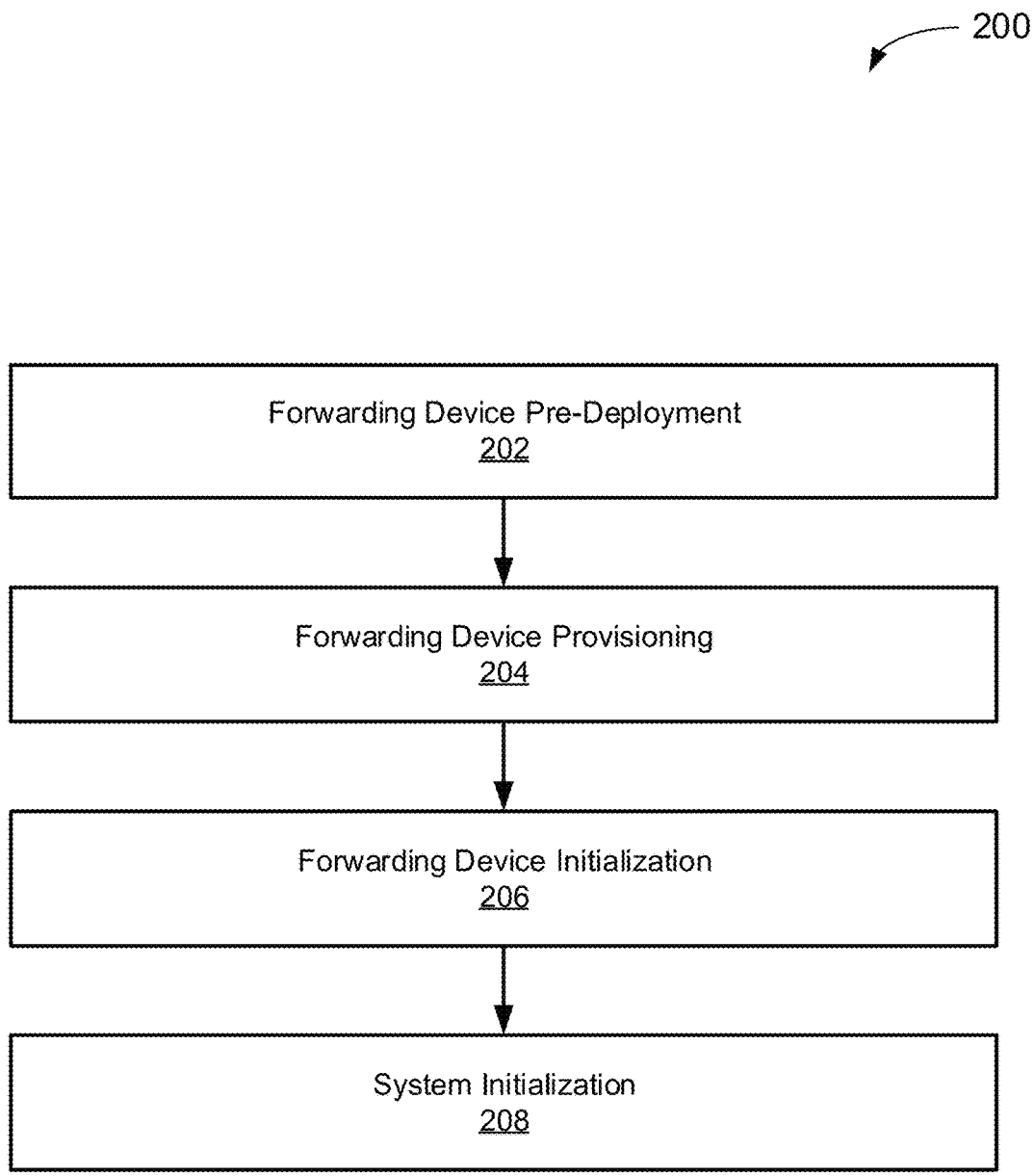
FIG. 2 depicts a flowchart of an example of a method of forwarding device deployment and system initialization.

FIG. 2 depicts a flowchart 200 of an example of a method of forwarding device deployment and system initialization. The flowchart 200 starts at block 202 with forwarding device (e.g., switch) pre-deployment. The actions and configurations taken during forwarding device pre-deployment can depend upon implementation and configuration-specific factors. For example, forwarding device pre-deployment can entail setting up a network orchestration and security platform, such as the network orchestration and security platform described by way of example in association with FIG. 1.

After setting up the platform, it may or may not be necessary to deploy a controller depending upon whether controller-less forwarding devices are deployed, though in a specific SDN implementation, at least an SDN controller is deployed prior to forwarding device deployment. Conceptually, any actions or configurations taken prior to deployment of a forwarding device could be considered part of forwarding device pre-deployment, with the mundane aspects being omitted from this paper and with the understanding techniques described in this paper may necessitate certain pre-deployment activities to ensure awareness of and proper function of deployed forwarding devices. Specifically, the network orchestration and security platform is intended to retain its complete visibility of network infrastructure before and after deployment of forwarding devices.

In the example of FIG. 2, the flowchart 200 continues to block 204 with forwarding device provisioning. An example of forwarding device provisioning is described in detail below with reference to FIG. 3. At block 206, the forwarding devices are initialized. An example of forwarding device initialization is described in detail below with reference to FIG. 4. At block 208, the system is initialized. An example of system initialization is described in detail below with reference to FIG. 5.

Figure 3:
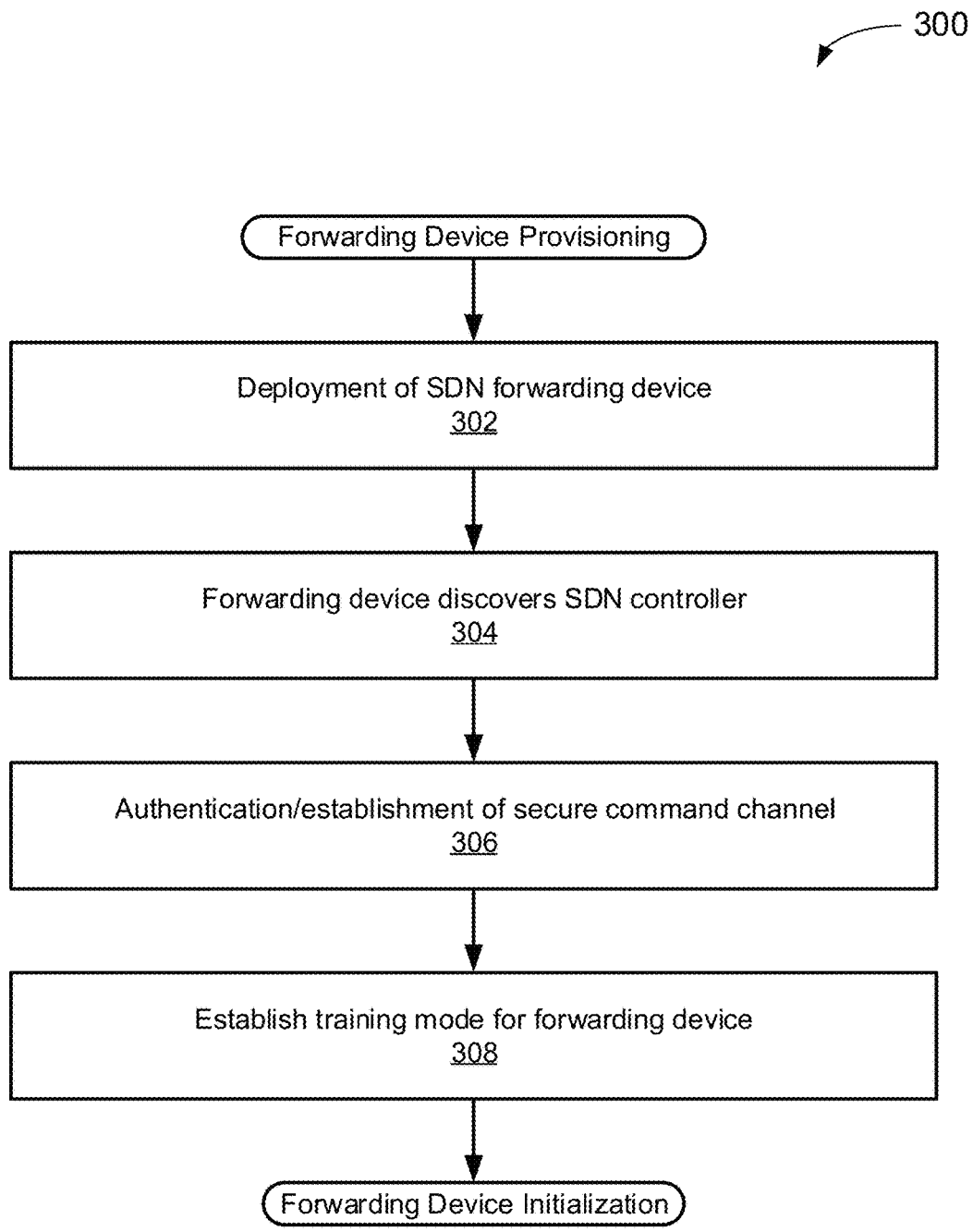
FIG. 3 depicts a flowchart of an example of forwarding device provisioning.

FIG. 3 depicts a flowchart 300 of an example of forwarding device provisioning. The flowchart 300 starts at block 302 with deployment of a software-defined networking (SDN) forwarding device. In an SDN-compatible implementation, administrators may manage network services through abstraction of lower-level functionality to facilitate dynamic, scalable computing and storage needs of more modern computing environments. This is done by decoupling the system that makes decisions about where traffic is sent (the control plane) from the underlying systems that forward traffic to the selected destination (the data plane). In an SDN-compatible implementation, the provisioning of the forwarding device may be carried out so as to support directly programmable network control and abstraction of underlying infrastructure from applications and network services.

At block 304, the forwarding device discovers the SDN controller. The forwarding device discovers the SDN controller, which controls behavior of the forwarding device in the network. At block 306, the forwarding device is authenticated by the controller and a secure command channel is established. The secure command channel enables communication with the forwarding device on the control plane. In a specific implementation, the control plane is decoupled from the data plane to support dynamic, scalable computing and enable administrators to manage network services through abstraction of lower-level functionality of the forwarding device.

At block 308, a training mode for the forwarding device is established. Industrial devices communicate with other devices in a known pattern which is unique for the site and device's role. In a specific implementation, the network traffic is inspected and protocol requests and responses are analyzed to identify a role of each device. Other indicators to define manufacturer and software/firmware revision levels can also be utilized. Upon the deployment of a new forwarding device to the network, a training mode is enabled which allows the controller to learn the flows needed, and responsively configure the forwarding device. During this process, the forwarding device is forwarding the data stream from its physical ports to the controller.

Figure 4:
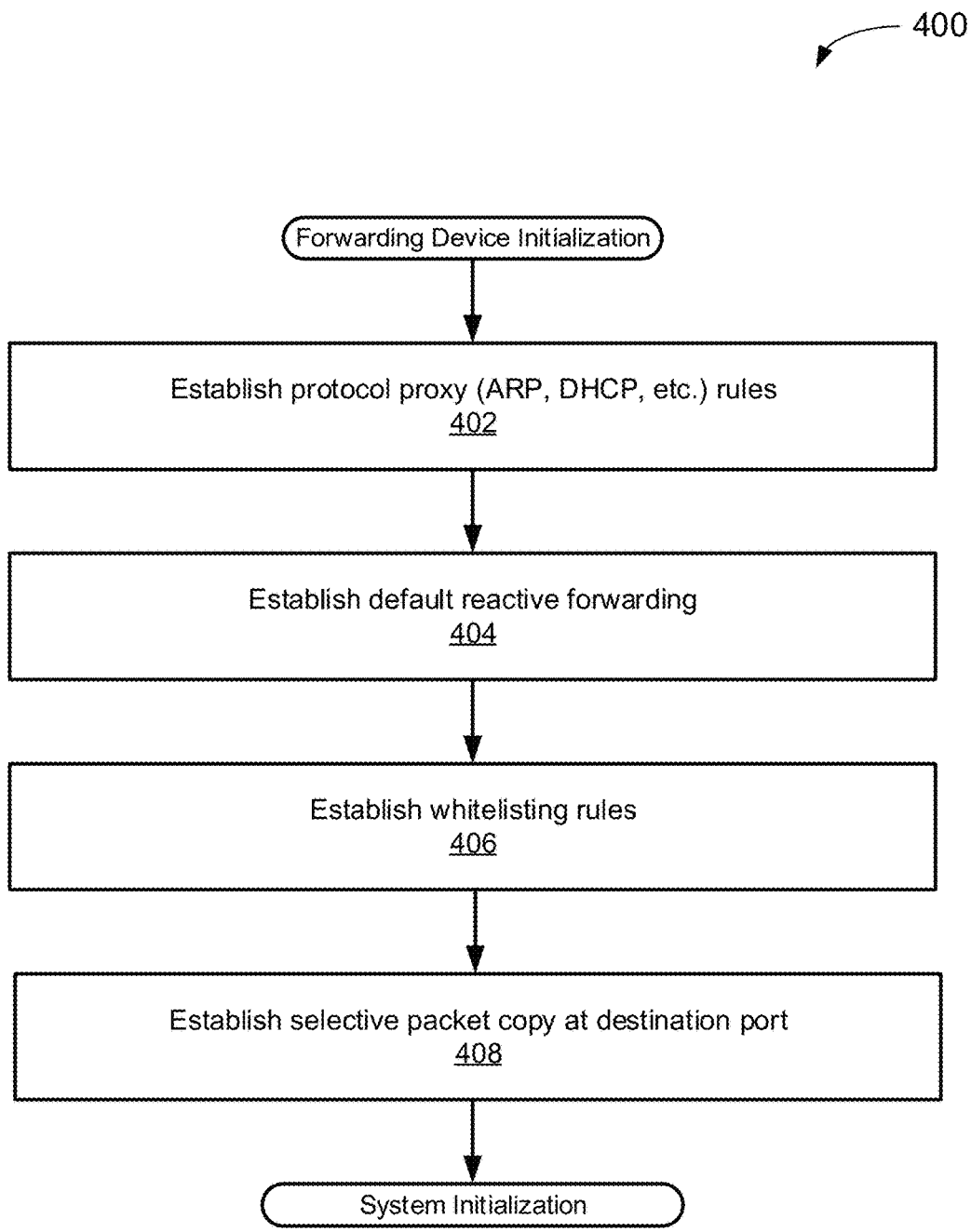
FIG. 4 depicts a flowchart of an example of forwarding device initialization.

FIG. 4 depicts a flowchart 400 of an example of forwarding device initialization. The flowchart 400 starts at block 402 where protocol proxy rules are established. Due to the network infrastructure visibility afforded by techniques described in this paper, certain legacy network services such as Address Resolution Protocol (ARP) and other network services such as Dynamic Host Configuration Protocol (DHCP) and Domain Name System (DNS) are not necessary as conventionally implemented. End point hosts connected to forwarding device infrastructure may utilize these services, but because broadcast traffic within the broadcast domain is eliminated, the technique can improve network efficiency. In a specific implementation, protocol proxies are used for applicable services: ARP Proxy, DHCP Proxy, and DNS Proxy, to name three.

In the example of FIG. 4, the flowchart 400 continues to block 404 where default reactive forwarding is established. In a specific implementation, a network orchestration and security platform (e.g., a SDN controller) pushes a configuration to a forwarding device to instruct the forwarding device to forward applicable traffic to an appropriate proxy server (e.g., SDN controller). The proxy server (e.g., SDN controller) then responds appropriately to the sender.

At block 406, full mesh whitelisting rules are established for assets on the network. Whitelisting allows only trusted communication between trusted assets. In an SDN-compatible implementation, assets are connected to SDN forwarding devices that are then connected via a command channel to an SDN controller. The controller identifies network flows, each of which has a whiteflow directive applied. This directive determines which assets are allowed to communicate and determines what the permitted protocols are, and the allowed actions. For example, a whiteflow directive may allow a SCADA server to initiate communications over HTTP with a PLC over a TCP port 80. As another example, a whiteflow directive may allow an HMI to communicate with an IED using the DNP3 protocol.

At block 408, selective packet copy at destination ports is established. A packet stream may be captured and forwarded to the controller for further analysis and/or analytics.

Figure 5A:
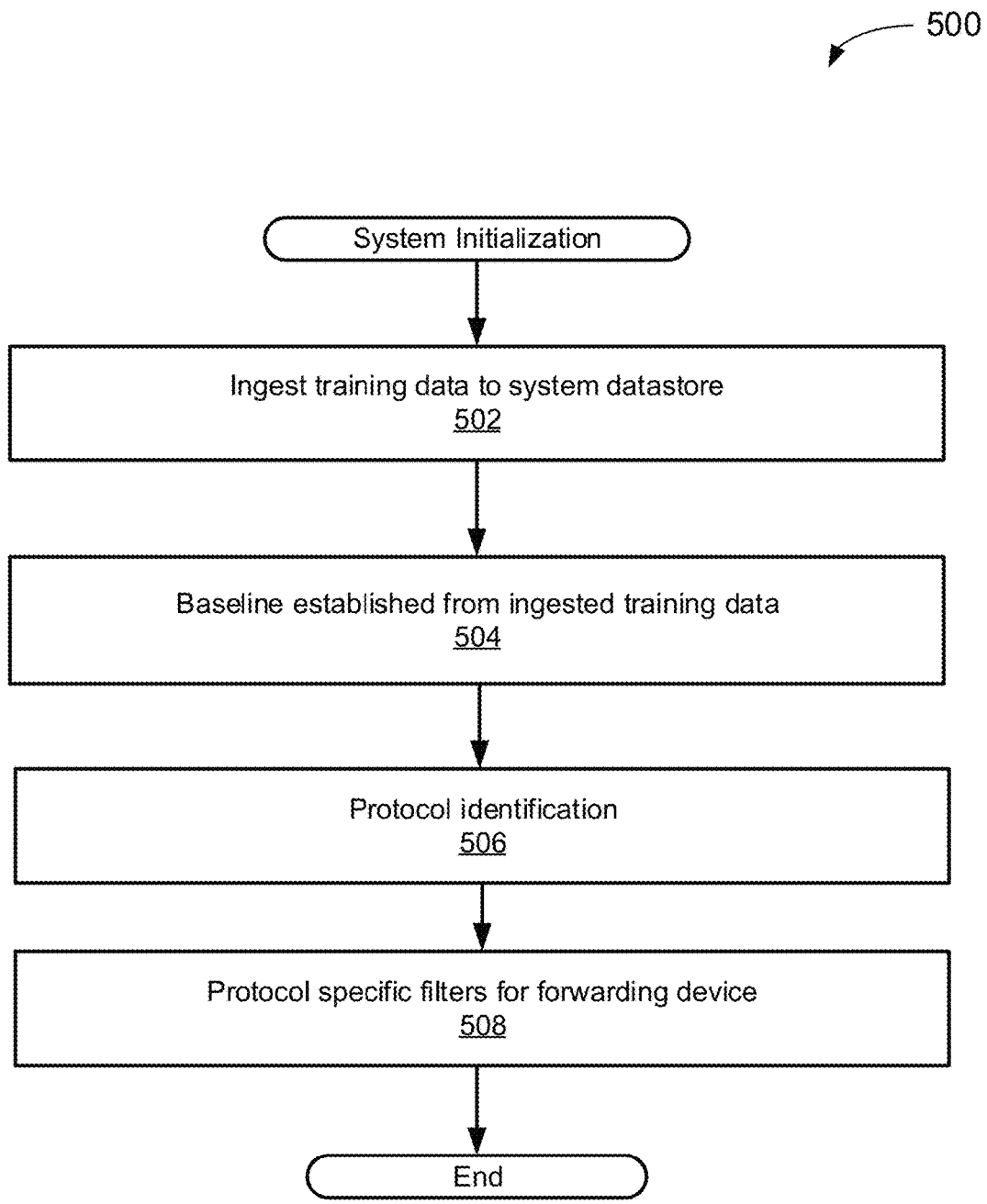
FIG. 5A depicts a flowchart of an example of system initialization.

FIG. 5A depicts a flowchart 500 of an example of a method for system initialization. The flowchart 500 starts at block 502 where training data is ingested to a system datastore (e.g., by manual user input) and proceeds to block 504 where a baseline is established from the ingested training data. In embodiments, the training data may generate a baseline mapping of the likelihood that a particular protocol and protocol behavior corresponds to an asset type.

Figure 5B:
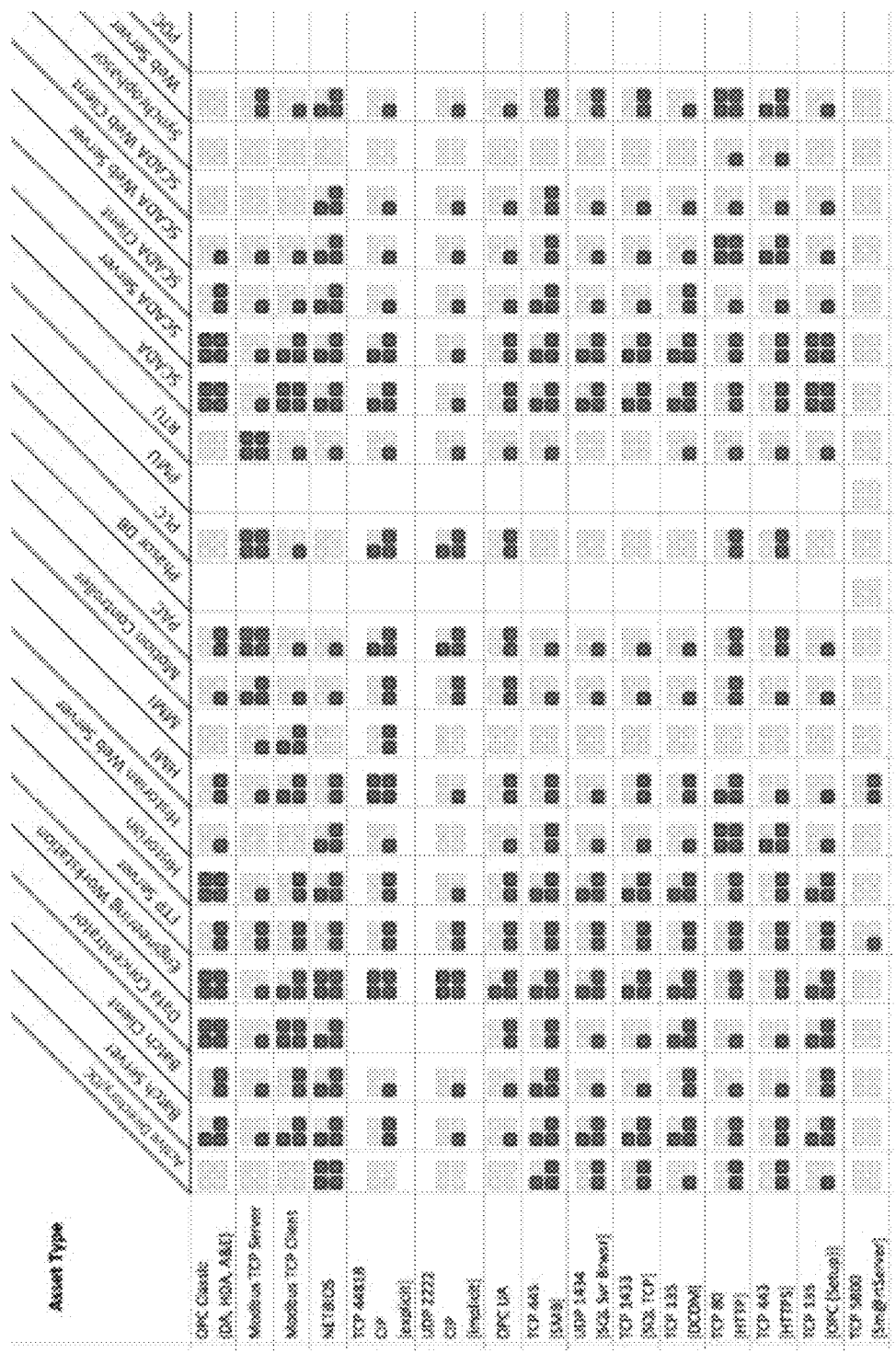
FIG. 5B illustrates an example behavioral tree mapping of protocol and protocol behaviors to asset types in an industrial network.

FIG. 5B illustrates an example behavioral tree mapping of protocol and protocol behaviors (e.g., UDP 2222 CIP (implicit), TCP 44818 CIP (explicit)) to asset types (e.g., HMI, PLC, SCADA) in an industrial network. As shown in this example, a five-level Likert scale indicates the likelihood that a particular protocol and protocol behavior is exhibited by an asset type. In this example, no solid squares indicates that an asset type never exhibits the protocol/protocol behavior, one solid square indicates that an asset type rarely exhibits the protocol/protocol behavior, two solid squares indicates that the asset type frequently exhibits the exhibits the protocol/protocol behavior, and four solid squares indicates that the asset type always exhibits the protocol/protocol behavior.

By way of example, the Activity Directory asset type will never use the three protocols of the Open Platform Communications classic family: data access (DA), historical data access (HAD), and Alarm and Events (A&E). By contrast, the Batch Server asset type will frequently use these protocols. As another example, if Modbus information is being sent using the Transmission Control Protocol (i.e., Modbus TCP), it may give an indication of the asset type depending on where Modbus TCP is acting as a server or a client. For example, if the protocol behavior is Modbus TCP Client, then it is much more likely that the asset type is supervisory such as a SCADA as opposed to a PLC. Conversely, if the protocol behavior is Modbus TCP Server, then it is much more likely that the asset type is a PLC as opposed to a SCADA.

Although the behavioral tree mapping of protocol behavior to asset type in FIG. 5B is implemented using a Likert scale with discrete levels, as would be appreciated by one having skill in the art, other mappings may be used. For example, a protocol behavior may be mapped to a continuous probability value (e.g., normalized to 0-1) for each asset type. Additionally, the mapping may be weighted based on the frequency with which an asset type appears in comparison to another asset type, the type of network where training data is being ingested, the presence of other protocols/protocol behaviors, and other factors. For instance, an industrial network of a power distribution center is likely to have a different distribution of asset types and protocols/protocol behaviors as compared to a manufacturing plant.

At block 506, protocols are identified. At block 508, protocol-specific filters are established for the forwarding device.

Figure 6A:
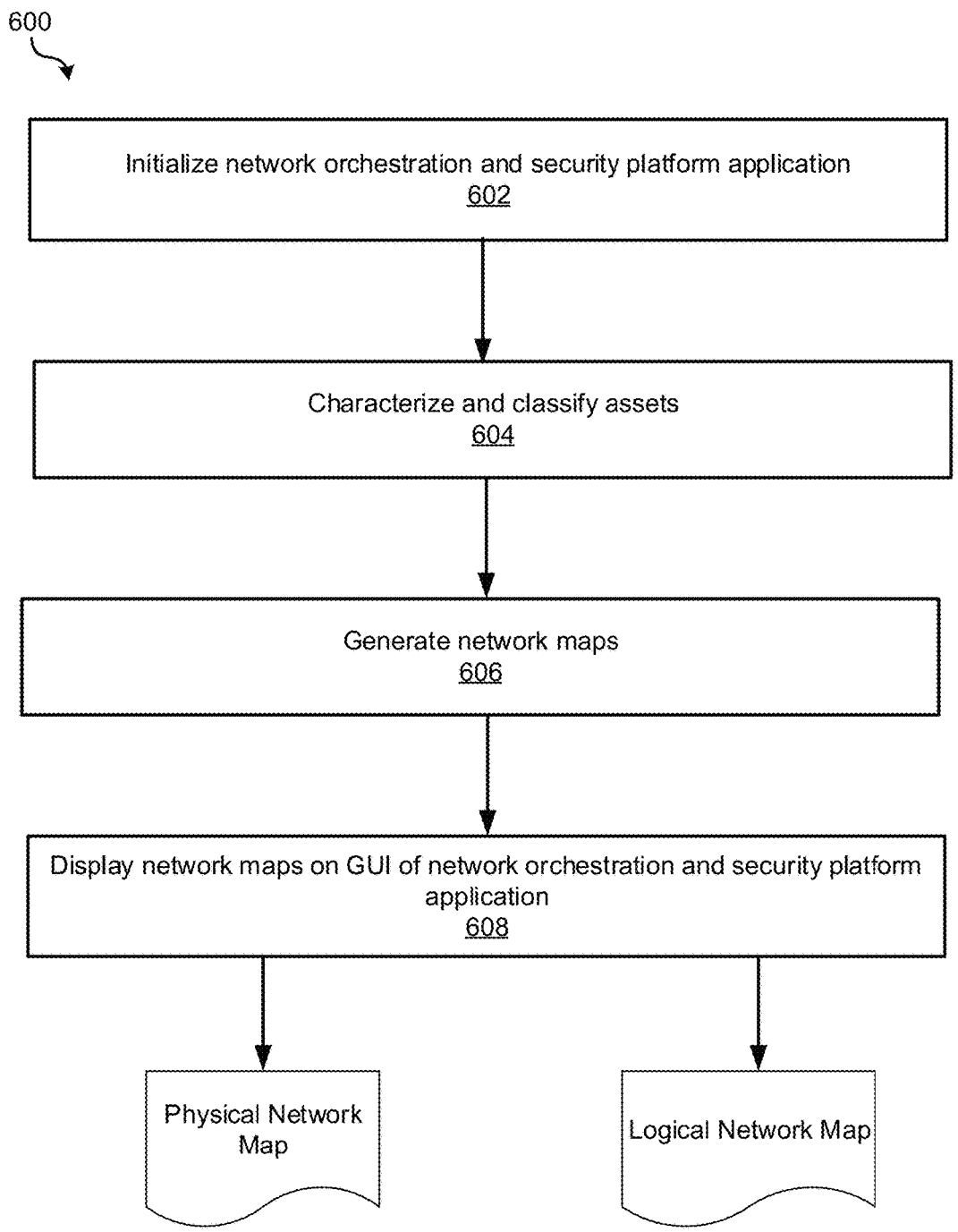
FIG. 6A depicts a flowchart of an example method of generating and displaying network maps on a graphical user interface of a network orchestration and security platform application.
Figure 6B:
FIG. 6B depicts an example graphical user interface of a network orchestration and security platform application for accepting new assets on a network.

FIG. 6A depicts a flowchart of an example method 600 of generating and displaying network maps on a GUI of a network orchestration and security platform application. FIG. 6A will be described in conjunction with FIGS. 6B-6F, which illustrate an example GUI of a network orchestration and security platform application that may be used to display the generated network maps. At block 602, a network orchestration and security platform application (e.g., application 130) is initialized. In embodiments, the application may be provided to a management access system 108 (e.g., a workstation, a mobile device, etc.) as a web application, a mobile application (e.g., client program installed on device directly connects with an API gateway), as a native-based application, as a cloud-based application or some combination thereof. The application may be accessed using a variety of frameworks, such as, for example, HTML 5, Angular JS, ASP.NET, etc. In SDN embodiments, the application may be used to manage a SDN controller.

At block 604, assets on the network are characterized and classified. For example, the following may be identified for an asset: asset type, asset vendor, asset level (e.g., under the Purdue Model), asset IP address, asset MAC address, and protocols/protocol behaviors. In a SDN-compatible implementation, prior to asset characterization, assets are connected to SDN forwarding devices that are then connected via a command channel to an SDN controller. The controller then identifies network flows, which may be used to characterize and classify the assets.

In embodiments, asset characterization and classification may comprise a network orchestration and security platform 106 (e.g., a controller) performing an initial, automated characterization and classification of an asset newly added to the network followed by manual review of a user accessing a network orchestration and security platform application. One such implementation is depicted by the example GUI of FIG. 6B, in which a user confirms new assets detected on the network and is given the option of editing asset information. Particular systems and methods for characterizing and classifying assets are described in greater detail in a copending U.S. Patent Application, titled "Network Asset Characterization, Classification, Grouping And Control", filed Sep. 18, 2017, which is incorporated herein by reference. Additionally, assets may be assigned to a security zone and whiteflow directives may established for the assets to create a whitelisting policy. All of the collected network data may be assembled into a dataset for visual transformation, further described below.

Figure 6C:
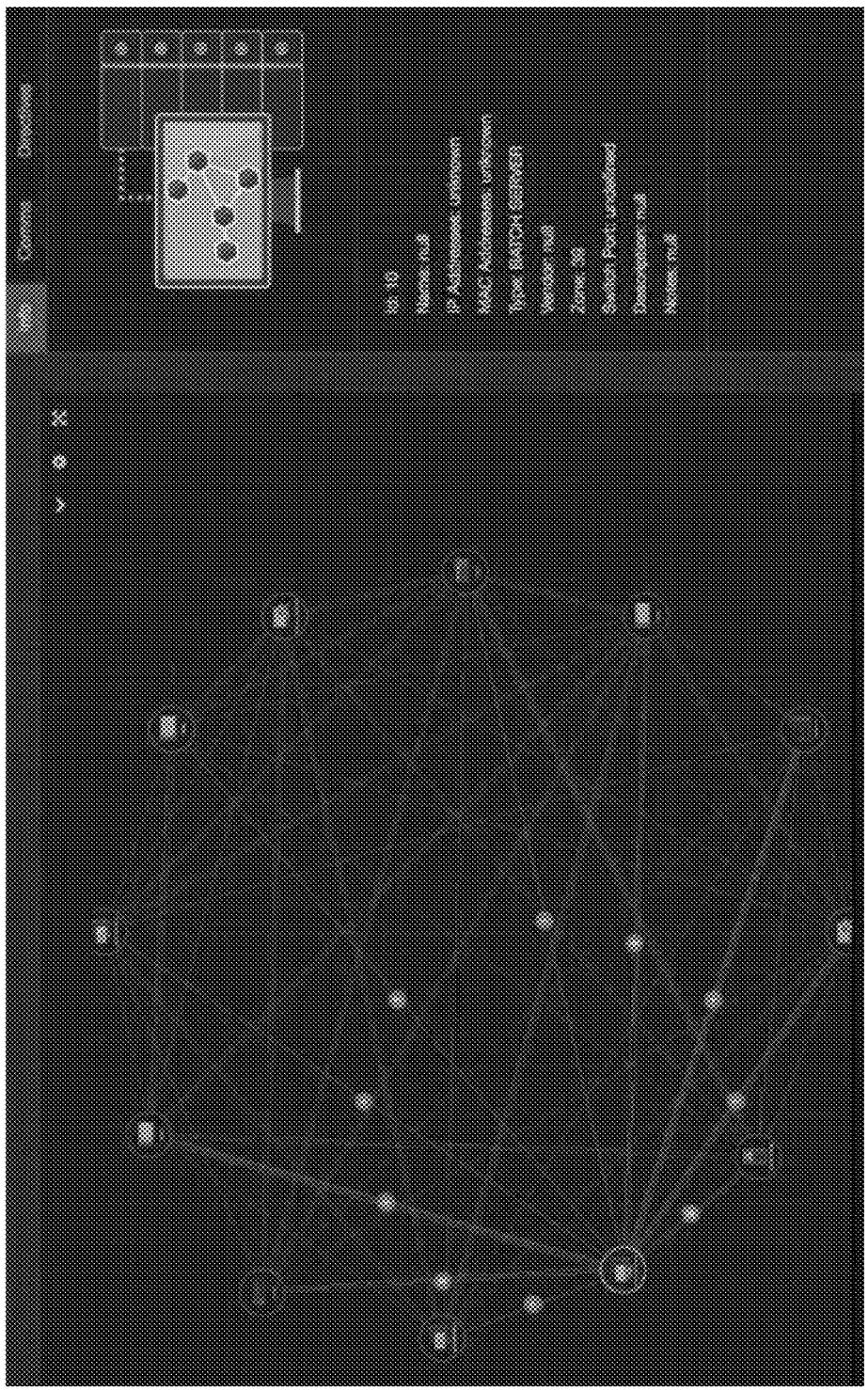
FIG. 6C depicts an example graphical user interface of a network orchestration and security platform application displaying a logical network map.

At block 606, one or more network maps (e.g., industrial network maps) are generated based on the characterized and classified assets. As further described below, the generated network maps may include a physical network map and a logical network map. At block 608, the generated network maps are displayed on the GUI of the network orchestration and security platform application. FIG. 6C depicts an example GUI of the network orchestration and security platform application displaying a visualization of a logical network map. In the logical network map, each conversation between assets is indicated graphically by a connecting link. Each protocol that is used for a conversation between assets has its own graphical connecting link. As shown in this example, when an asset is selected (e.g., by clicking on the asset), the conversation links to the asset are highlighted and information identifying and classifying the asset may be displayed. For example, the selected asset in FIG. 6C is a batch server asset type assigned a unique network ID 10. In implementations, displayed conversation links may represent a historical view of the network over a predefined period of time (e.g., hours, days, weeks, months, years, etc.) in order to represent an accurate depiction of all conversation/protocol conversations. In further implementations, a user may filter the logical network map by time period, thereby displaying conversations that took place during a specific point in time. For example, a dataset of a whitelisting policy associated with a particular time period may be loaded from a datastore. Although FIG. 6C illustrates a visualization of a logical network map for an entire network, in some implementations a logical network map of a subset of the network (e.g., by security zone) may be visualized.

Figure 6D:
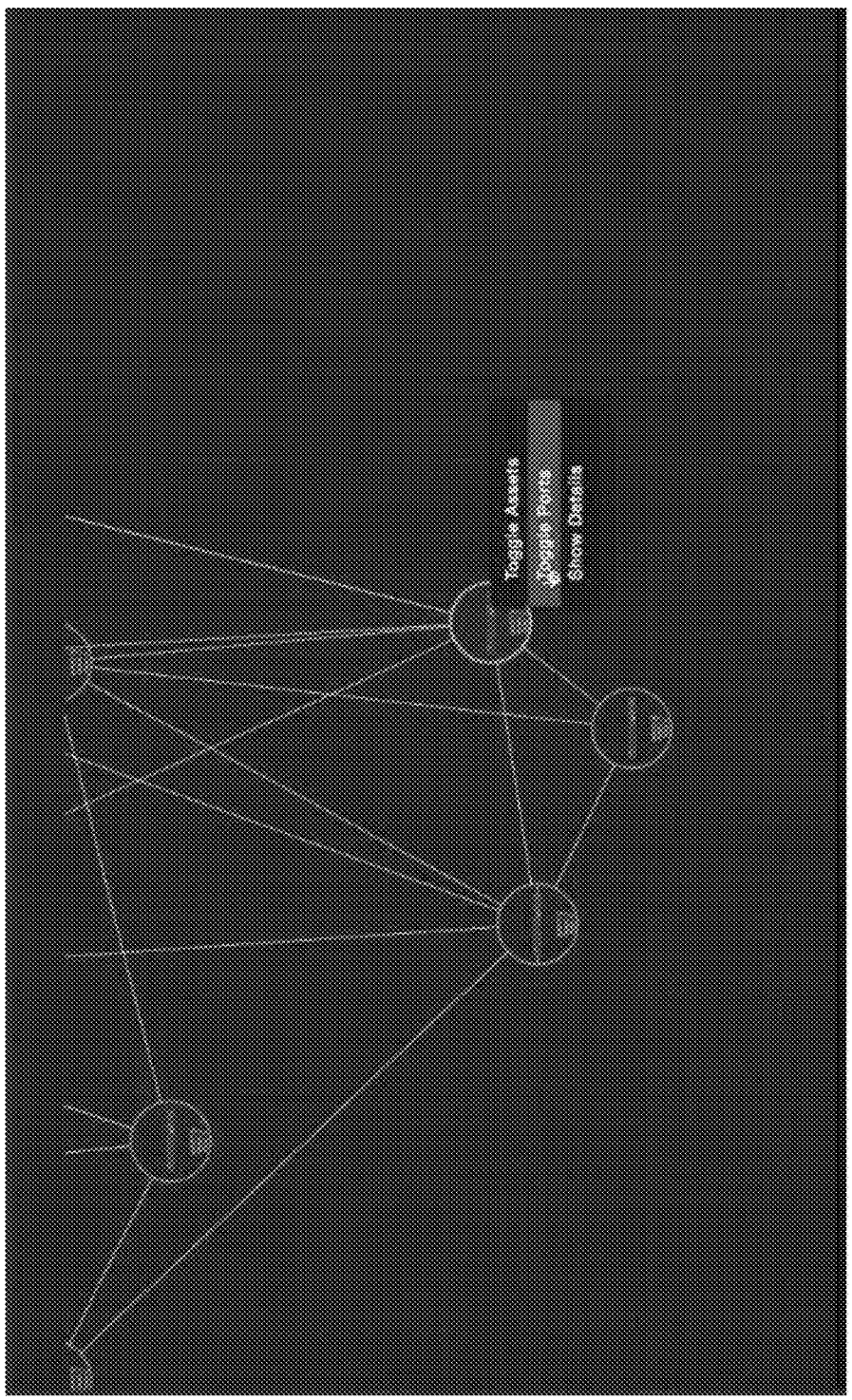
FIG. 6D depicts an example graphical user interface of a network orchestration and security platform application displaying a physical network map.
Figure 6E:
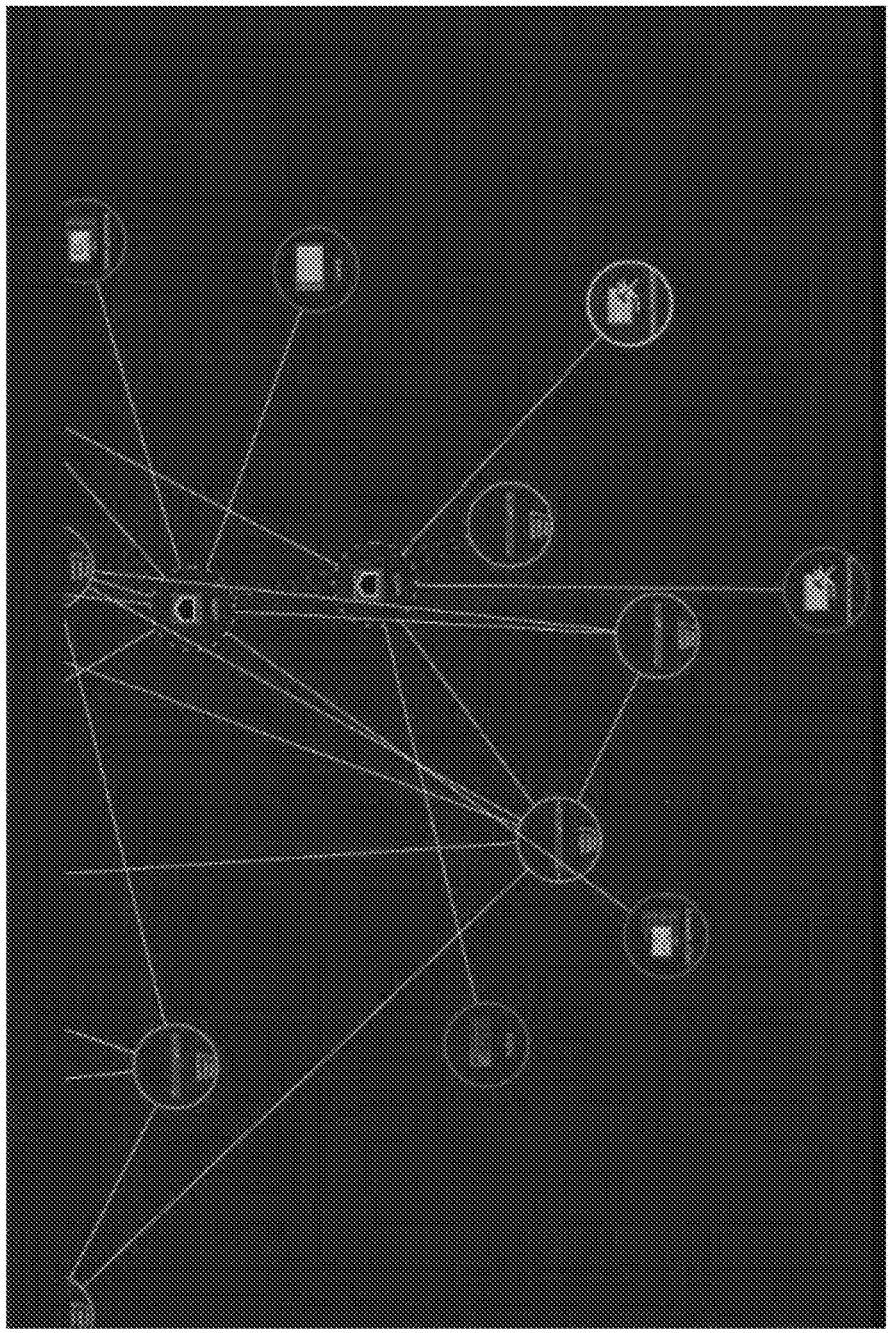
FIG. 6E depicts an example graphical user interface of a network orchestration and security platform application displaying a physical network map.
Figure 6F:
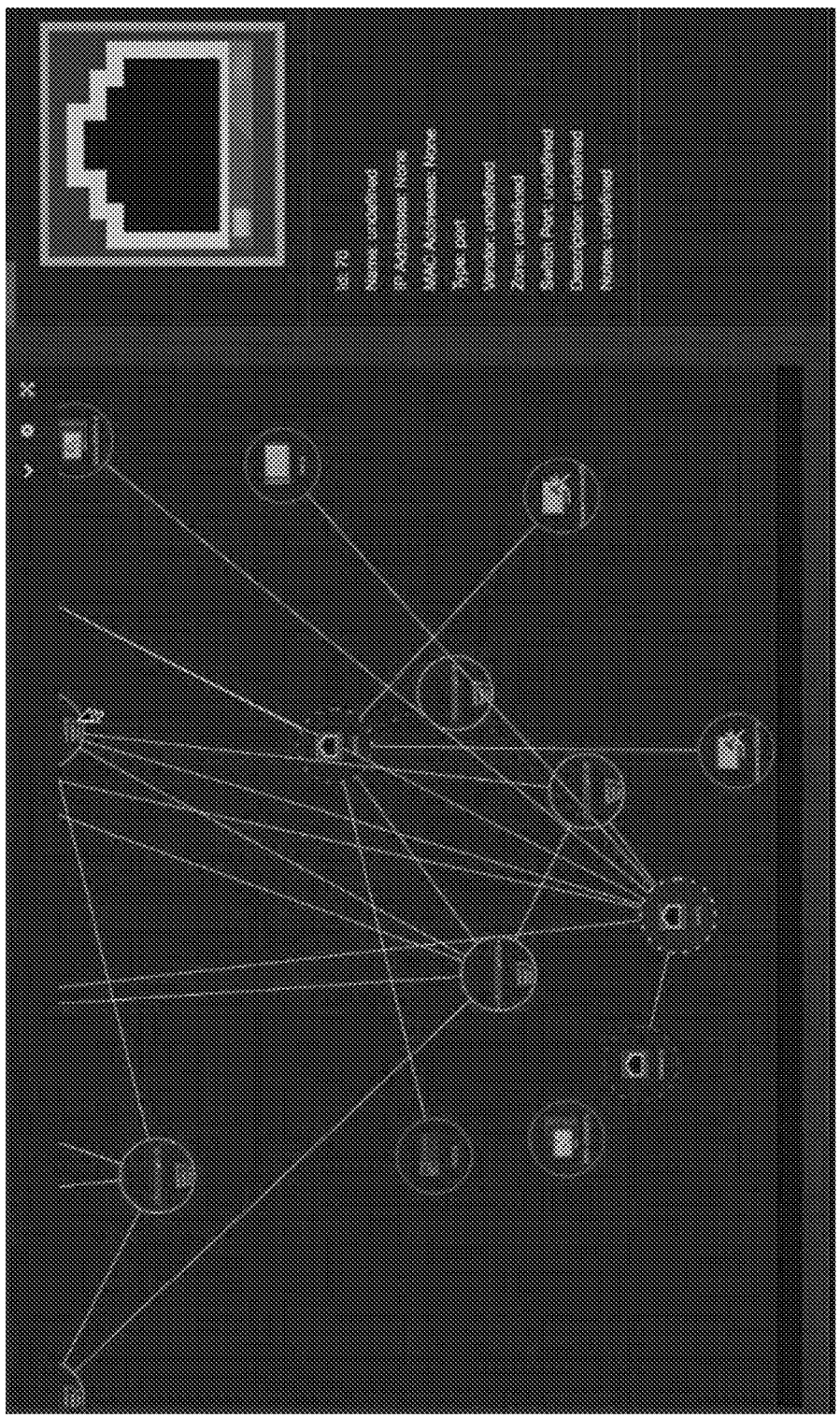
FIG. 6F depicts an example graphical user interface of a network orchestration and security platform application displaying a physical network map.

FIGS. 6D-6F depicts an example GUI of the network orchestration and security platform application displaying a visualization of a physical network map. As illustrated by FIG. 6D, the physical network map may graphically display all connections between forwarding devices (e.g., switches) on the network. A user may select one of the forwarding devices and toggle the ports of the forwarding device and/or assets connected to ports of the forwarding device to display the assets/ports. FIGS. 6E-6F illustrate the physical network map after ports and assets have been toggled. As shown in FIG. 6F, selection of a port of a forwarding device (e.g., a switch port) may display port information. Although FIGS. 6D-6F illustrate a visualization of a physical network map for an entire network, in some implementations a physical network map of a subset of the network may be visualized.

Figure 7A:
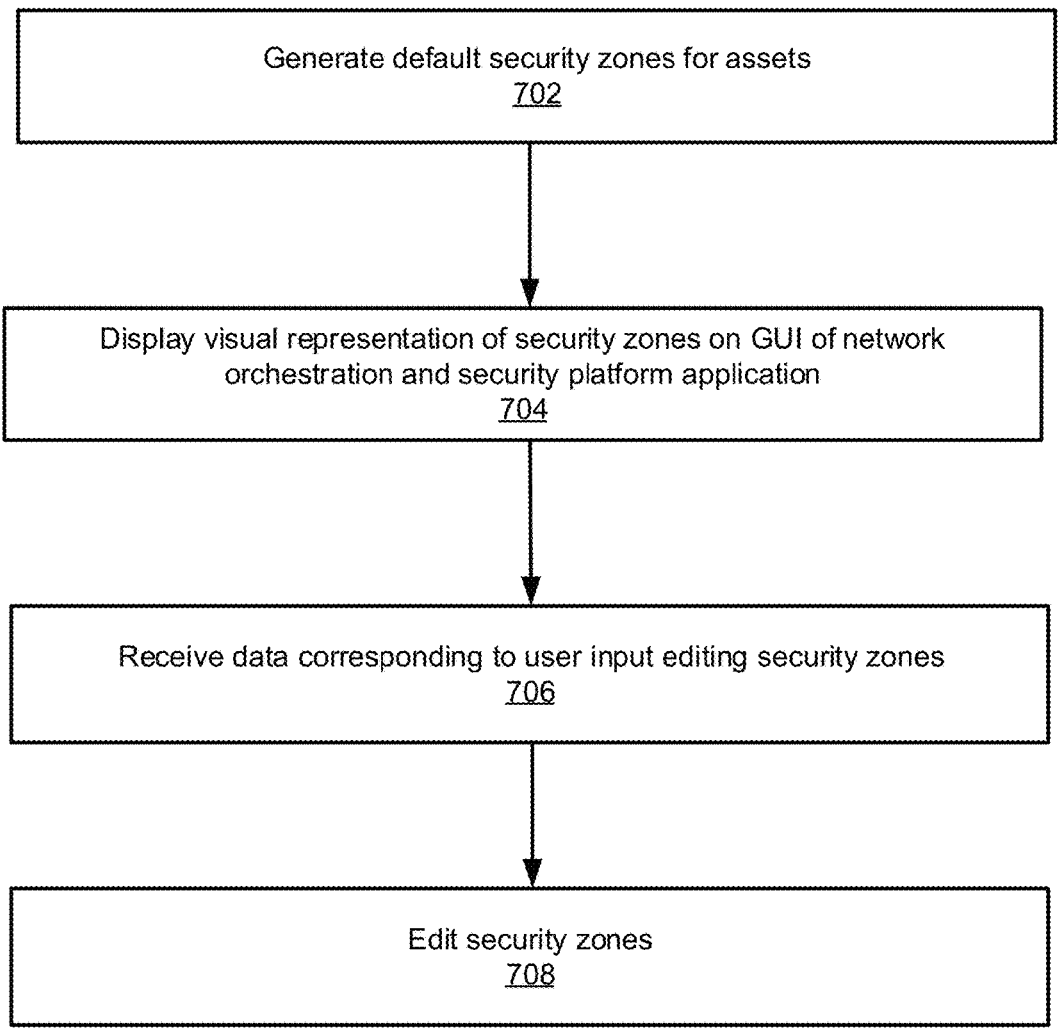
FIG. 7A depicts a flowchart of an example method of visually representing and editing security zones.

FIG. 7A depicts a flowchart of an example method 700 of visually representing and editing security zones. FIG. 7A will be described in conjunction with FIGS. 7B-7C, which illustrate an example GUI of a network orchestration and security platform application that may be used to display a visual representation of the security zones. At block 702, default security zones may be automatically generated for assets on the network by a network orchestration and security platform. For example, default security zones may be generated by observing the regularity of communications between assets and the type of communication between assets. By way of example, consider an industrial network where communication between a first device and second device is observed to take place over Modbus TCP at subsecond updates with a determinism of within 500 ms. Also, consider that the server implementation of Modbus TCP is the first device and the client implementation of Modbus TCP is device B, and that the function codes consistently read registers coming from device 2 to device 1. From this combination of behaviors it may be determined that device 1 is a PLC, device 2 is an HMI, and that the devices should be logically grouped into the same security zone. Particular systems and methods for generating security zones are described in greater detail in a copending U.S. Patent Application, titled "Network Asset Characterization, Classification, Grouping And Control", filed Sep. 18, 2017, which is incorporated herein by reference.

Following generation of default security zones, a user may manually modify the generated security zones by moving visual representations assets from one security zone to another security zone, by assigning assets without a security zone to another security zone, by deleting security zones, by creating a new security zone, or by performing some other function.

Figure 7B:
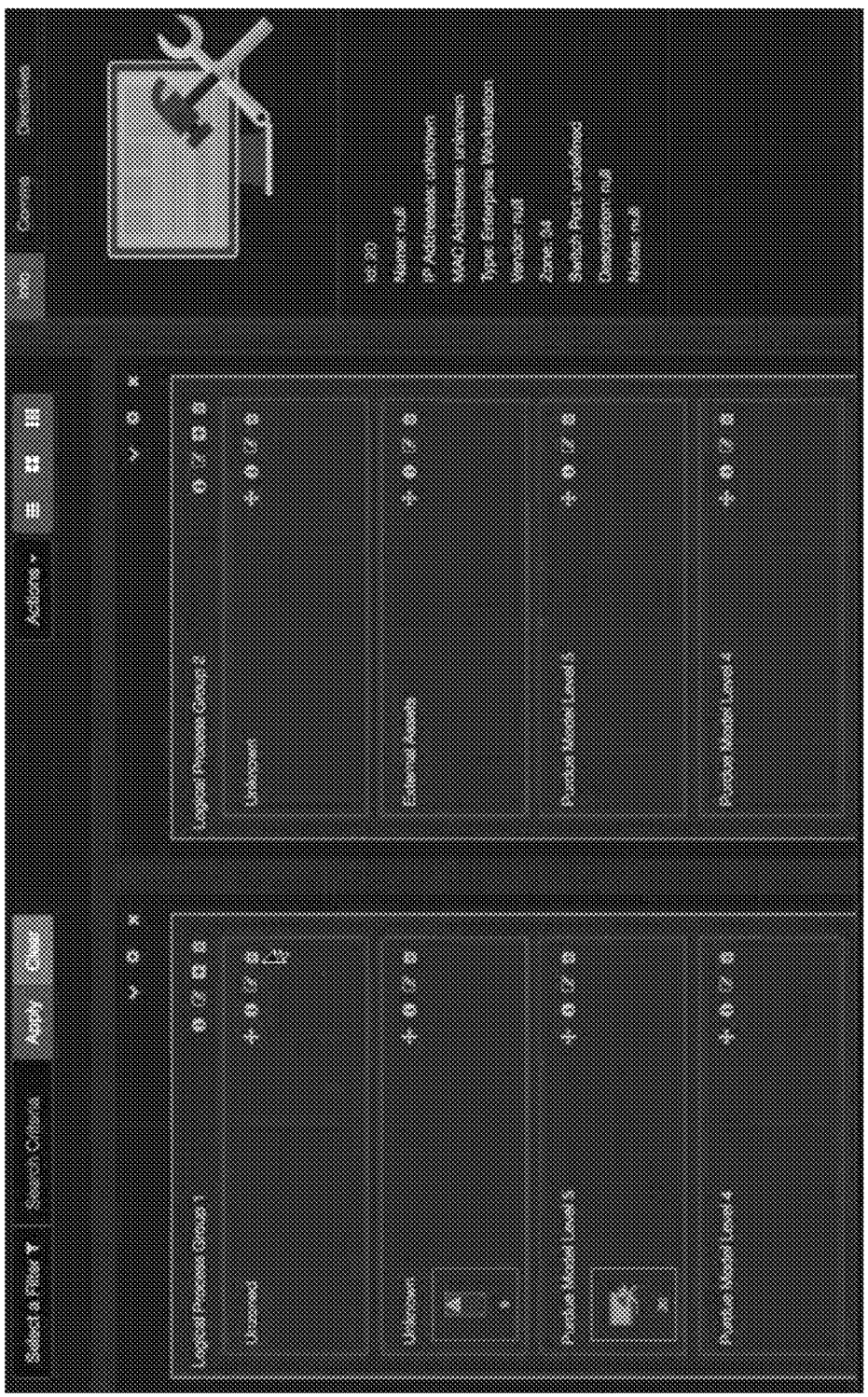
FIG. 7B depicts an example graphical user interface of a network orchestration and security platform application displaying a visual representation of created security zones.
Figure 7C:
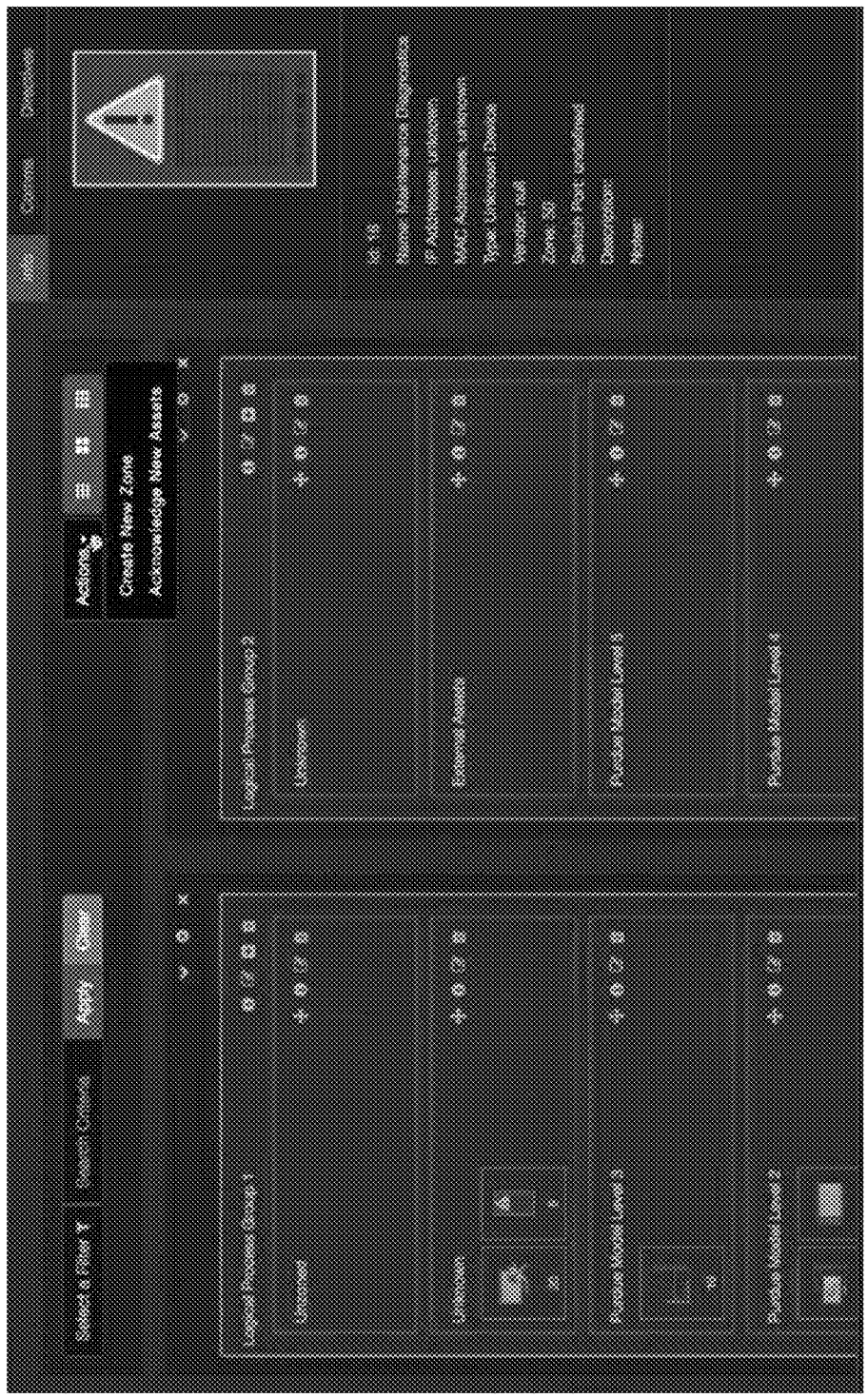
FIG. 7C depicts an example graphical user interface of a network orchestration and security platform application displaying a visual representation of created security zones.

At block 704, a visual representation of the generated security zones is displayed on a GUI of a network orchestration and security platform application. One such example visual representation is illustrated by FIG. 7C. As shown, security zones (i.e., "logical process groups") are visually represented as a logical container of assets. In industrial network implementations, security zones may visually represent a logical container of assets whose function is related to the automation of a related physical process. For example, the infeed process for a chemical facility may have an automated system for the delivery of raw product from rail cars and trucks and unloading of the dry product to storage silos and to batch tanks for wet product. In industrial network implementations, the security zone logical container may additionally group assets by conceptual level within the Purdue Reference Model for Control Hierarchy logical framework (ISA99 Committee, 2004).

Figure 8A:
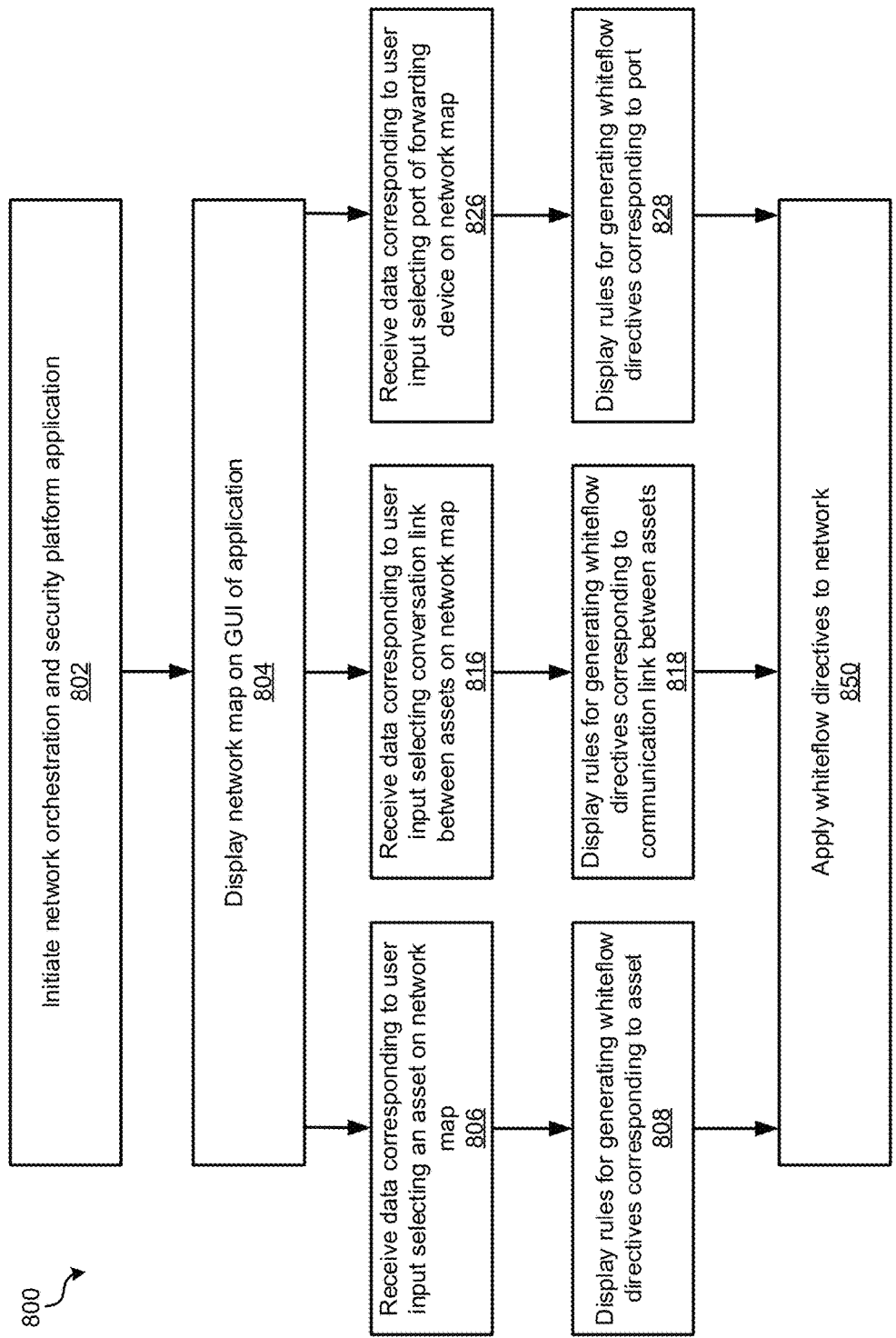
FIG. 8A depicts a flowchart of an example method of visually creating whitelisting policies using a graphical user interface of a network orchestration and security platform application.

At block 706, the application receives data corresponding to user input editing one or more security zones, and at block 708 the one or more security zones are edit. The changes to the security zone may be stored in a datastore of the network orchestration and security platform. For example, a user may create a new security zone (illustrated by FIG. 7C), move an asset from one security zone to another security zone, move an asset without an assigned security zone into a security zone, or perform some other operation on a security zone. In the implementation of FIGS. 7B-7C, the visualization of the security zones provide a simplified method of moving visual representations of assets from one zone to the next by the user. For example, a user may drag and drop assets from one security zone to another security zone or drag and drop assets not initially assigned to a security zone into a security zone. At block 708, in response to receiving the use FIG. 8A depicts a flowchart of an example method 800 of visually creating whitelisting policies using a GUI of a network orchestration and security platform application. FIG. 8A will be described in conjunction with FIGS. 8B-8E, which illustrate an example GUI of a network orchestration and security platform application that may be used to set whiteflow directives for assets using various visual approaches. At block 802, a network orchestration and security platform application is initiated. At block 804, a network map is displayed on the GUI of the application. For example, a logical network map or a physical network map as described with reference to FIG. 6A may be displayed. In some instances, the network map may first need to be generated (e.g., as described with reference with FIG. 6A). For example, after initializing the network orchestration and security platform application, a user may select a whitelisting policy, and a network map may be generated from this whitelisting policy.

Figure 8B:
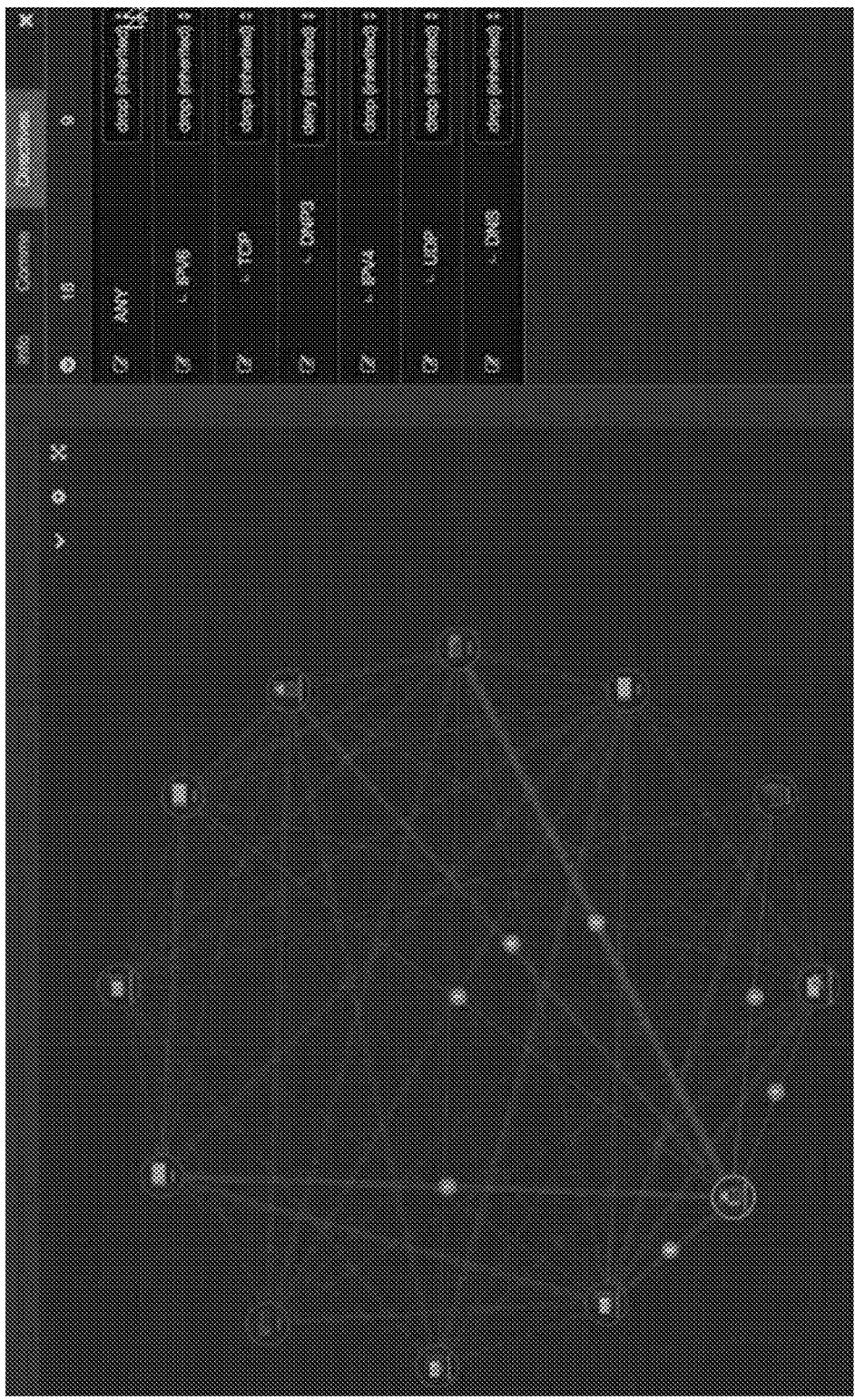
FIG. 8B depicts an example graphical user interface of a network orchestration and security platform application whereby assets may be selected on a logical network map to set whiteflow directives.

Following display of a network map, a user may visually configure whiteflow directives between assets following a plurality of different visual approaches. With reference to a first visual approach, at block 806 the application receives data corresponding to user input selecting an asset on a network map. For example, the user may click on an asset displayed on a network map. At block 808, rules (e.g., drop conversation link, deny conversation link, allow conversation link, generate system alert) for generating whiteflow directives corresponding to the asset are displayed. The rules may be displayed in response to the user selecting the asset or after selection of an additional tab or menu (e.g., "directives") that is made available after the user selects the asset. FIG. 8B illustrates the approach of blocks 806-808 using a logical network map. As illustrated in this example, a list of conversation links associated with the selected asset are displayed. The list displays the protocol behavior of each conversation link and provides the user with the option of taking action with respect to each conversation link (e.g., DROP, DENY, ALLOW, ALERT) by selecting a drop down tab.

With reference to a second visual approach, at block 816 the application receives data corresponding to user input selecting a conversation link between assets on a network map. At block 818, rules (e.g., drop conversation, deny conversation, allow conversation, generate system alert) for generating a whiteflow directive corresponding to the conversation link are displayed. The rules may be displayed along with the protocol behavior of the conversation link and identification of the assets on the conversation link.

Figure 8C:
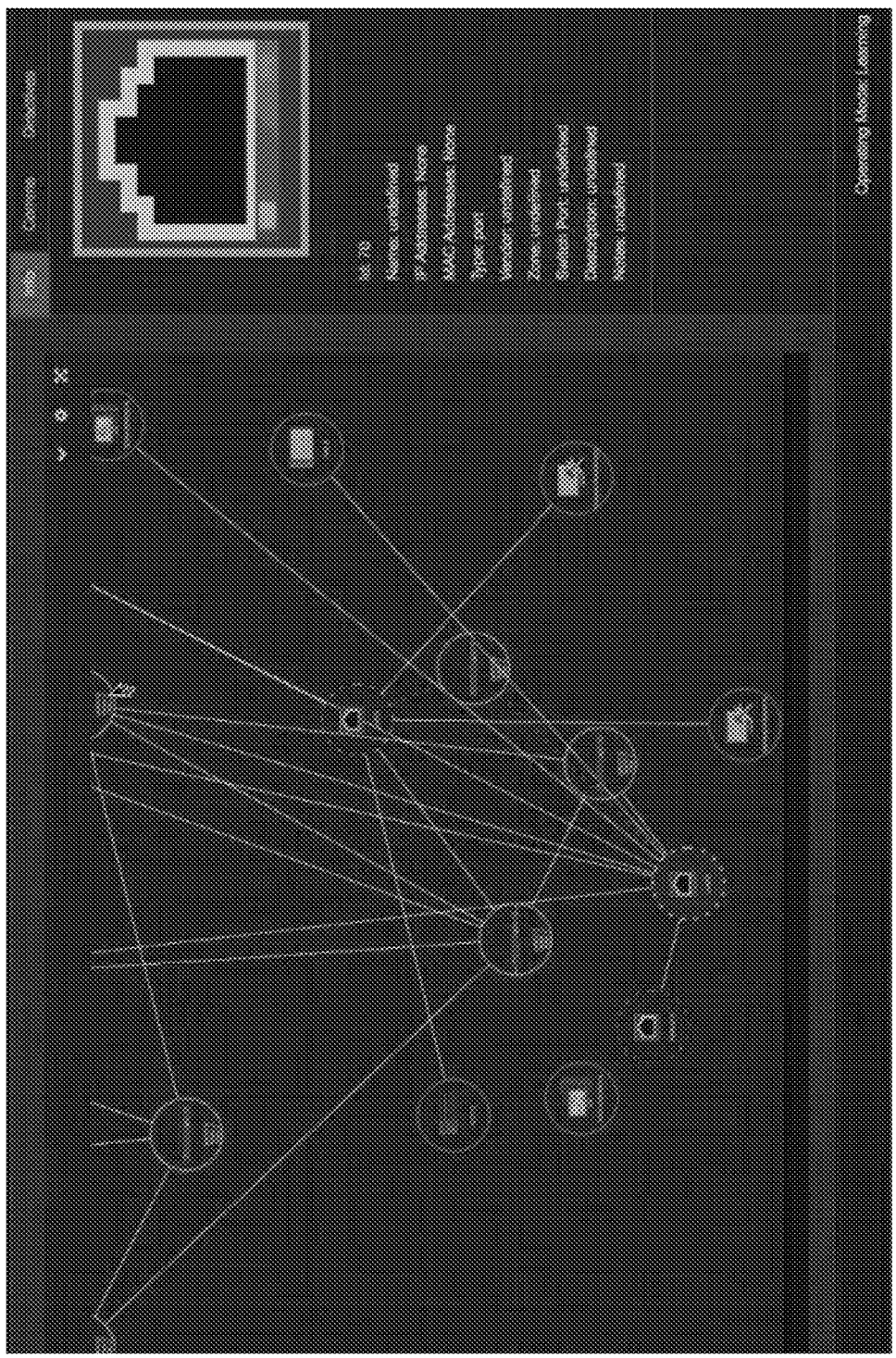
FIG. 8C depicts an example graphical user interface of a network orchestration and security platform application whereby assets may be selected on a physical network map to set whiteflow directives.

With reference to a third visual approach, at block 826 the application receives data corresponding to user input selecting a port of a forwarding device port on a network map. At block 828, rules (e.g., drop conversation, deny conversation, allow conversation, generate system alert) for generating whiteflow directives corresponding to conversation links that traverse the port are displayed. The rules may be displayed along with the protocol behavior of the conversation links and an identification of the assets on the conversation link. FIG. 8C illustrates the approach of blocks 826-828 using a physical network map. In this example, a physical port of a switch is selected.

In response to the user generating whiteflow directives (i.e., defining what conversations are allowed on the network), at block 850 the whiteflow directives may be applied to the network. For example, in a SDN implementation a controller may generate the appropriate flow rules and actions for each forwarding device in the infrastructure based on a whitelisting policy created by the collection of whiteflow directives. In such an implementation, centralized orchestration (controller) with distributed execution (forwarding devices) is provided.

Figure 8D:
FIG. 8D depicts an example graphical user interface of a network orchestration and security platform application whereby whiteflow directives may be modified in a tabular format.

Although implementations for visually creating whitelisting policies have primarily been described with reference to using visual representations of network maps, in some implementations, whiteflow policies may be created by displaying rules in a tabular format or other suitable format for generating whiteflow directives. One such implementation is illustrated by FIG. 8D, which shows a graphical user interface displaying a list of whiteflow directives associated with a threat state level (e.g., DEFCON 5). As shown, for each communication flow between a source asset and a destination asset using a defined protocol, a user may apply a rule to the communication flow.

Figure 9A:
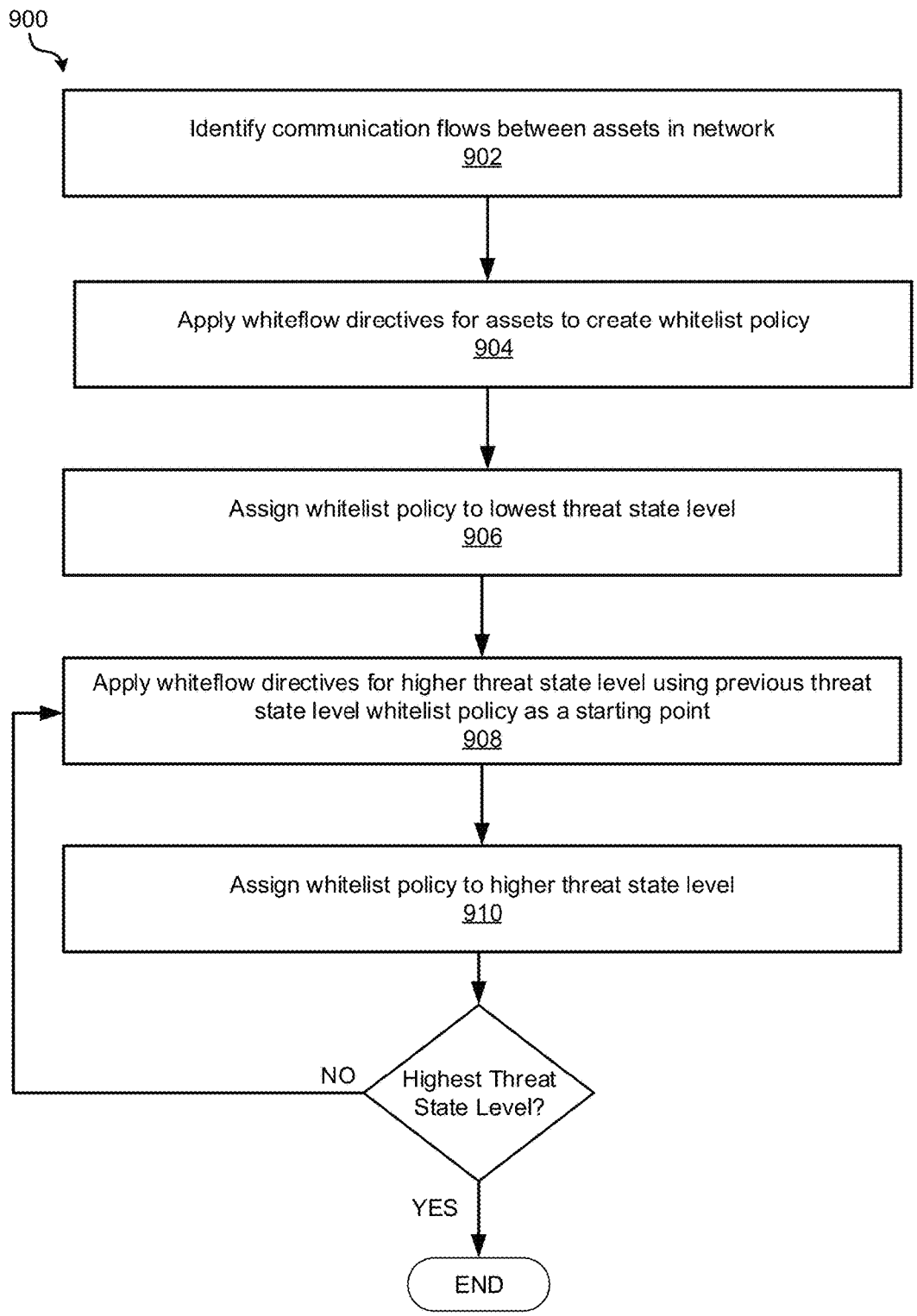
FIG. 9A depicts a flowchart of an example method of creating whitelisting policies using a threat state model.

FIG. 9A depicts a flowchart of an example method 900 of creating whitelisting policies using a threat state model. As further described below, the disclosed method configures whitelisting policies starting from a least restrictive threat state level. To configure a whitelisting policy for a higher threat state level, the whitelisting policy of the previous threat state level is used as a starting point and made more restrictive. In other words, the whitelisting policy of the higher threat state level comprises a subset of the whiteflow directives of the lower threat state level. Associating elastic trust zones based on a threat state model is a unique approach to control and expand security controls on industrial control systems, based on the identified threat level. This approach results in policies that become more restrictive in terms of what devices are permitted to communicate as well as how they communicate, based on threat levels. This methodology results in policies that are like a funnel in that the most permissive policy is at the wide part of the funnel, with the most restrictive policy at the narrow end of the funnel.

With reference now to method 900, at block 902 communication flows between assets in the network are identified. In a SDN implementation, SDN forwarding devices are connected to a SDN controller (e.g., via command channel) that identifies each network flow between assets such that a whiteflow directive may be applied to each network flow.

At block 904, whiteflow directives are applied for assets in the network to create a whitelisting policy. At block 906, the created whitelisting policy is assigned to a lowest threat state level. The created whitelisting policy and metadata identifying its associated threat state level may be stored in an operational data store of the network. At block 908, whiteflow directives for a higher threat state level are applied using the previous threat state level whitelisting policy as a starting point. A whitelisting policy is created from these directives and it may be stored in the operation data store of the network. At block 910, the whitelisting policy is assigned to the next, higher threat state level. This process iteratively continues until a whitelisting policy has been assigned to the highest threat level of the threat state model.

In one implementation, the threat state model is based on the DEFense readiness CONdition model of the US Military, DEFCON, made applicable to security measures for, e.g., an industrial network that controls a physical process. In this implementation, a whitelisting policy is created for the five DEFCON levels, DEFCON 5 being the least restrictive (i.e., threat nonexistent) and DEFCON 1 being the most restrictive. By adopting this type of methodology, the security for a site becomes agile and adaptable to the threat state of the system or site. This approach can provide a reduction in autonomous attack surface of the industrial control system. Thus, when the threat is nonexistent (DEFCON 5), the maximum functionality and connectivity can be realized. Yet, when there is a direct threat against the system the system can ensure the mission critical function of the process is insured at an appropriate level (DEFCON 4, 3, 2, or 1) to define an associated defensive posture for cybersecurity.

Figure 9B:
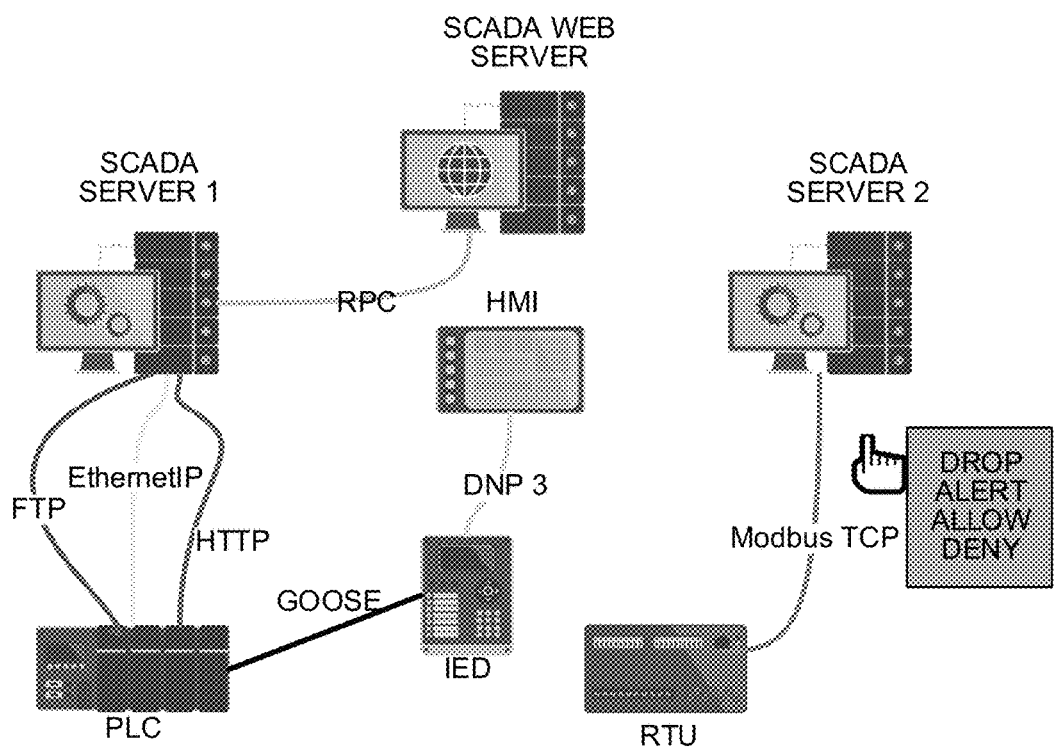
FIG. 9B depicts whiteflow directives between assets in an example industrial network during a DEFCON 5 threat state level.
Figure 9C:
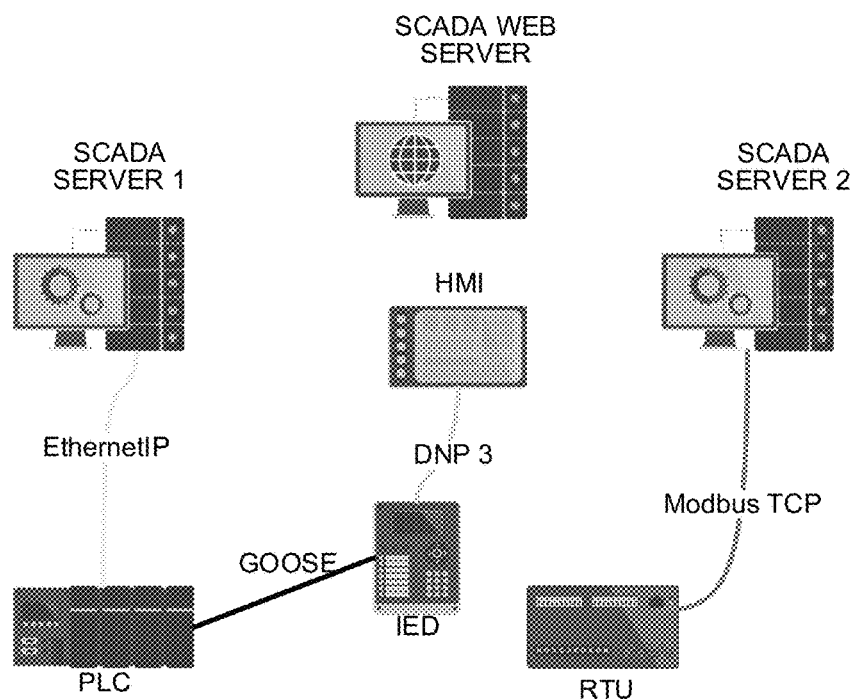
FIG. 9C depicts whiteflow directives between assets in the industrial network of FIG. 9B during a DEFCON 1 threat state level.

FIG. 9B depicts whiteflow directives between assets in an example industrial network during a DEFCON 5 threat state level. FIG. 9C depicts whiteflow directives between assets in the industrial network of FIG. 9B during a DEFCON 1 threat state level. As illustrated, the network of FIG. 9C is more restrictive and does not allow communications between SCADA server 1 and the SCADA web server. Additionally, the network does not permit FTP and HTTP protocol communications between the PLC and SCADA Server 1.

In a SDN implementation, as threat indicators, threat intelligence or other factors determine that the threat level has risen past the defined state definition, the threat state level may be automatically changed to a higher defense readiness level. This may automatically load the policy in the controller which creates the appropriate whiteflow directives for each forwarding device and deploys a new predefined configuration to each forwarding device in the network infrastructure.

Figure 10A:
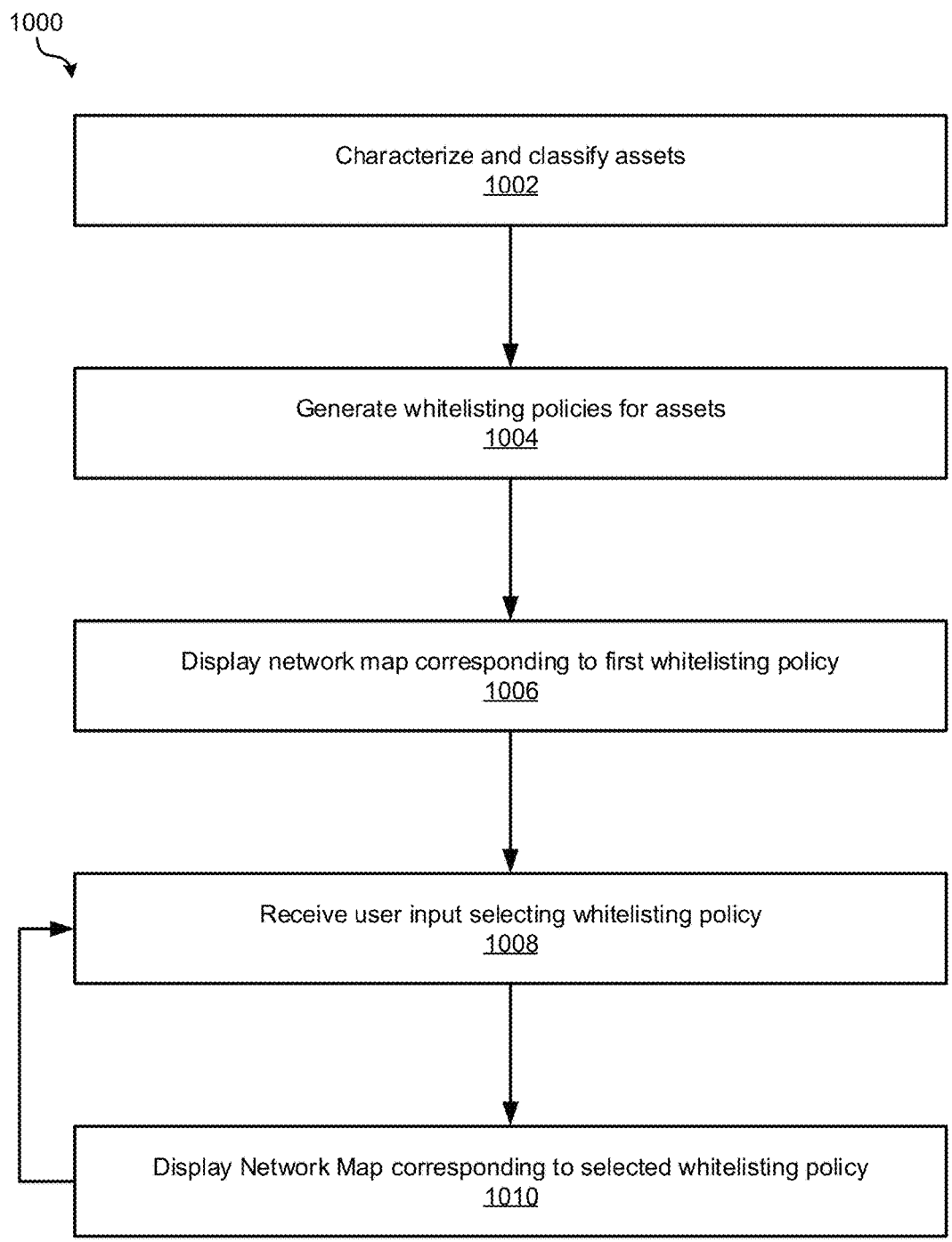
FIG. 10A depicts a flowchart of an example method of simulating and visualizing the effects of different whitelisting policies on a network.

FIG. 10 depicts a flowchart of an example method 1000 of simulating and visualizing the effects of different whitelisting policies on a network. Method 1000 may be implemented, for example, by a user of a management access system 108 accessing an application 130 that provides a GUI for visualizing whitelisting policies and network maps. In implementations, method 1000 may be used to visualize a simulation of the effects of new whitelisting policies on industrial processes before they are deployed for enforcement.

At block 1002, assets on the network are characterized and classified. As discussed above, in SDN implementations, a controller may capture all communications between assets and all communication protocols/behaviors being used. Using this captured information, assets may be characterized and classified. At block 1004, whitelisting policies are generated for assets. At block 1006, a network map corresponding to one of the generated whitelisting policies is displayed (e.g., on a GUI of a network orchestration and security platform application). For example, a logical network map may be displayed for a whitelisting policy corresponding to a lowest threat state level. The logical network map may depict all assets connected to the network, including communication flows and the protocols being used. When a threat to a system is at its lowest threat state, such a whitelisting policy would be in effect. This would represent the most permissive policy with the objective of enabling all non-critical services. For example, the policy may restrict which assets can communicate with each other but may allow any type of communication.

Figure 10B:
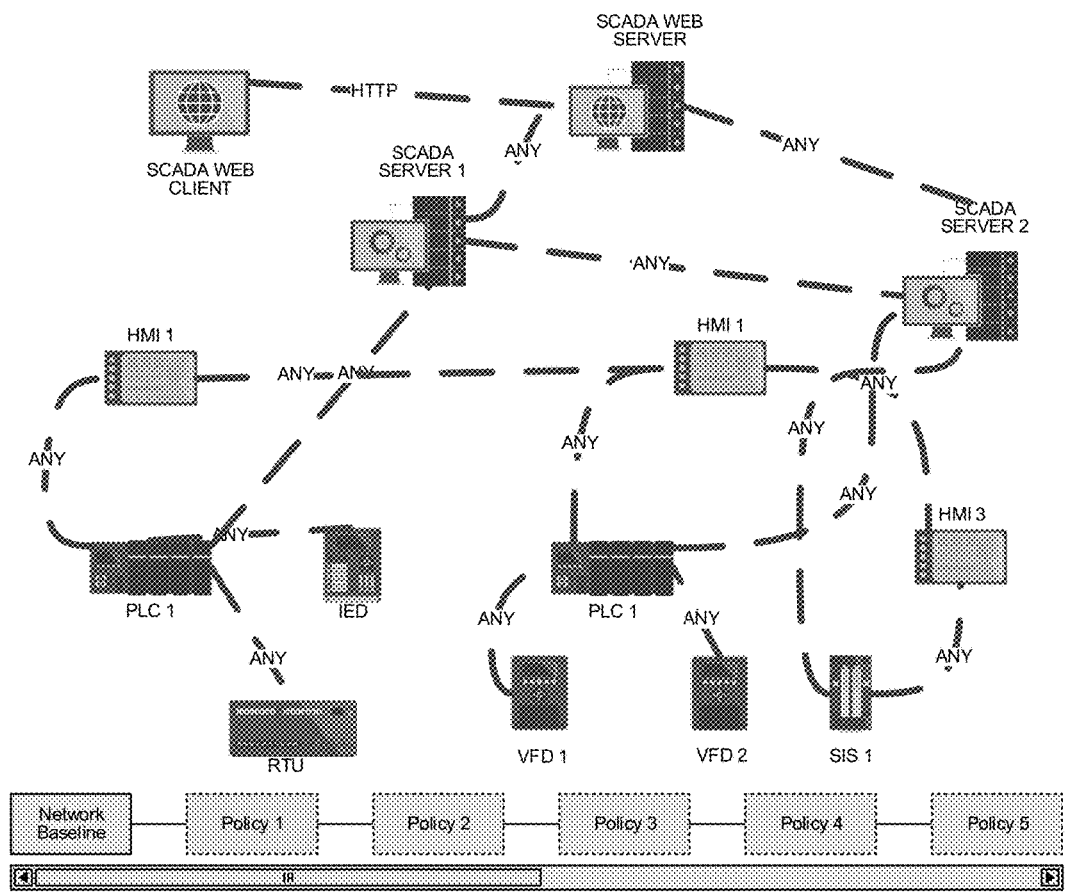
FIG. 10B illustrates an example implementation of a GUI of a network orchestration and security platform application whereby a user may drag a slider to advance a policy effect viewer through different policy configurations.
Figure 10C:
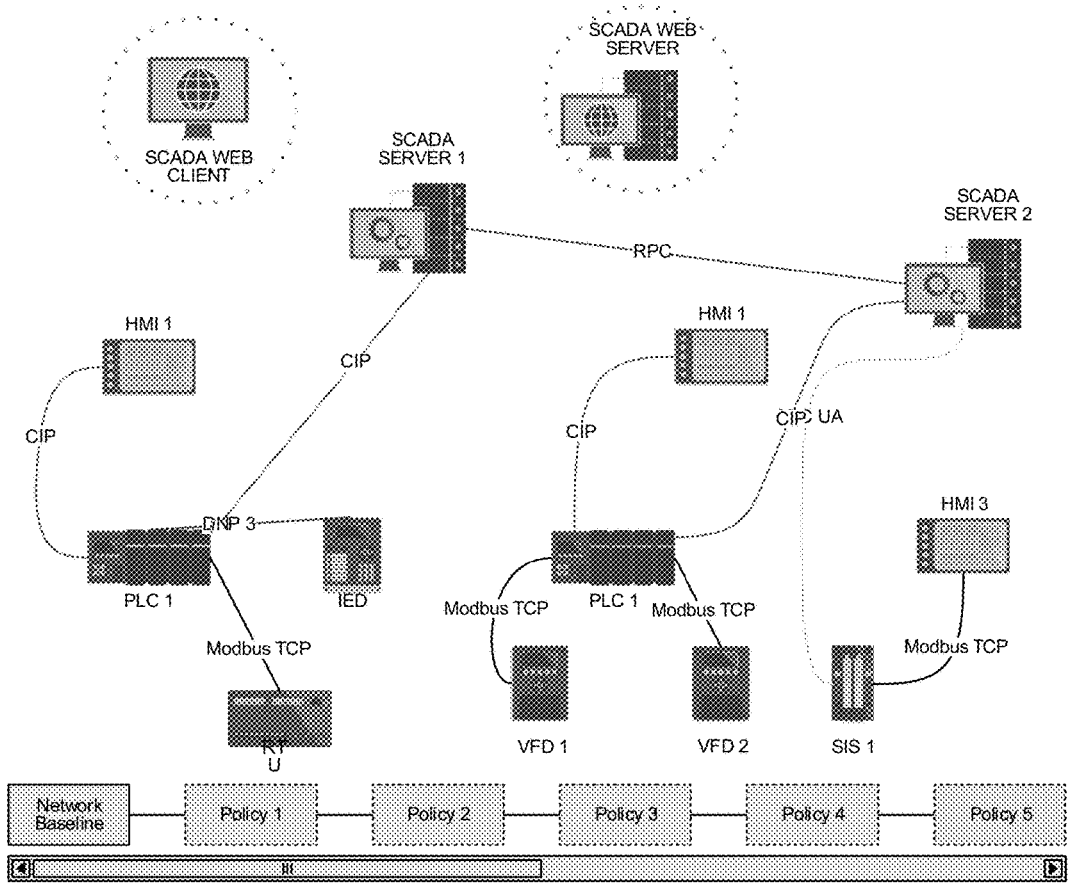
FIG. 10C illustrates an example implementation of a GUI of a network orchestration and security platform application whereby a user may drag a slider to advance a policy effect viewer through different policy configurations.

At block 1008, user input corresponding to selection of a whitelisting policy is received. For example, a user of a GUI of a network orchestration and security platform application may select a whitelisting policy corresponding to a different threat state level by dragging a slider, by selecting a drop down box, or by some other method. FIGS. 10B-10C illustrate one such example implementation of a GUI of a network orchestration and security platform application whereby a user may drag a slider to advance a policy effect viewer through different policy configurations. In response to the user input selecting the whitelisting policy, at block 1010 the displayed network map may be updated to reflect the asset communications permitted for the selected policy. For instance, in the industrial networking example of FIG. 10C, the user selects a whitelisting policy corresponding to the highest threat state level (Policy 5), which eliminates communication flows of non-essential network services and the functionality of ICS devices and ancillary systems. In this example network state, the SCADA web server and SCADA web client devices are no longer permitted to have any communication as they are not mission-critical. Additionally, communication flows for example SOAP via HTTP between HMI's have also been eliminated because they are not mission-critical.

Following the approach of method 1000, a user may determine the objective for each policy based upon a disaster response planning of the system and the definition of each threat state level to the system. Based upon these objectives, the user may define a security policy to meet the objective and generate a graphical visualization of the effects of the policy for peer feedback.

Figure 11A:
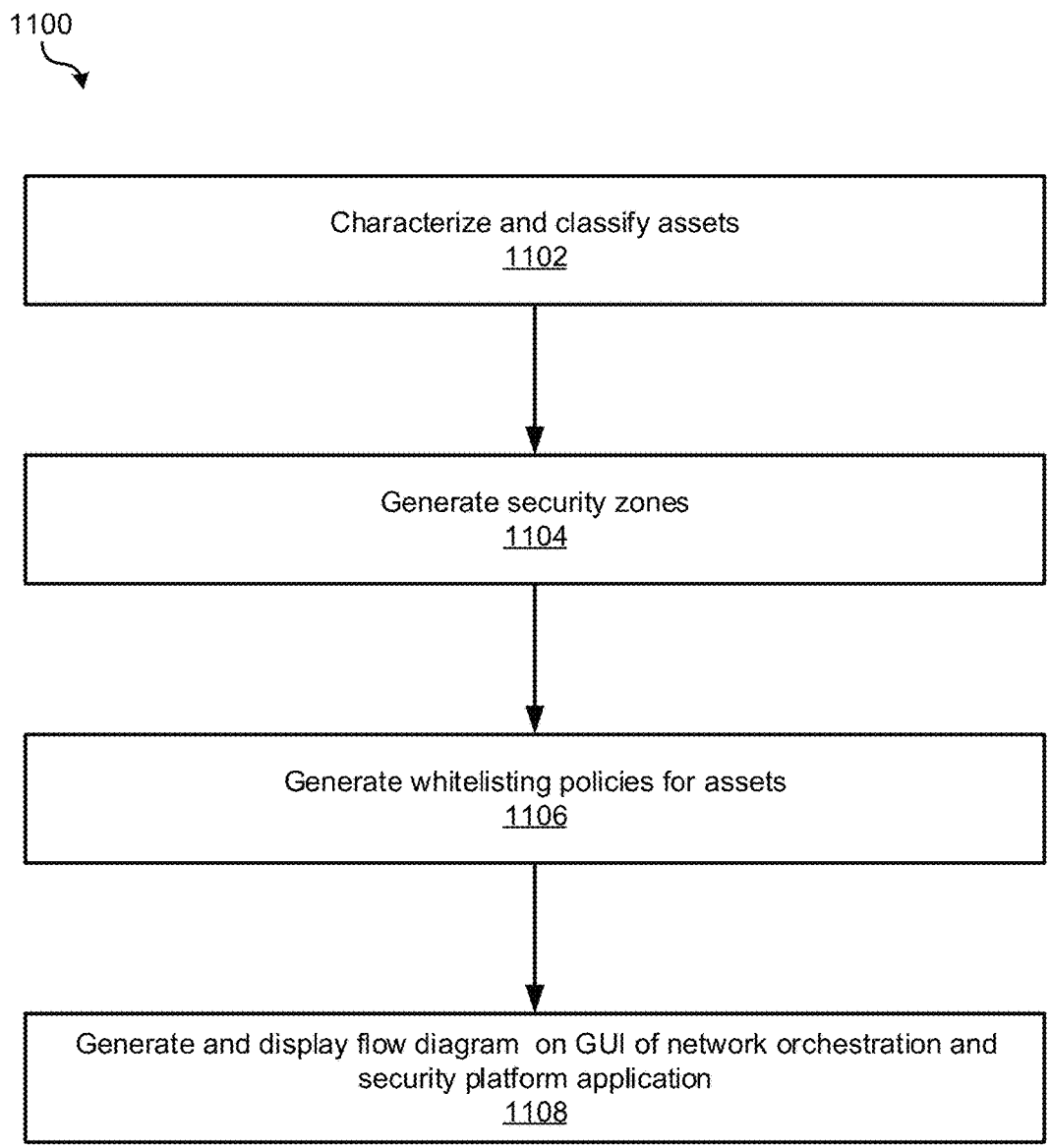
FIG. 11A depicts a flowchart of an example method of generating a network flow diagram on a graphical user interface of a network orchestration and security platform application.

FIG. 11A depicts a flowchart of an example method 1100 of generating a network flow diagram on a GUI of a network orchestration and security platform application. As further described below, the network flow diagram may provide an intuitive way of visually analyzing all communications taking place between assets on the network. At block 1102, assets on the network are characterized and classified. At block 1104, security zones are generated for the assets. At block 1106, whitelisting policies are generated for the assets. At block 1108, a flow diagram is generated and displayed on a GUI of the network orchestration and security platform application.

Figure 11B:
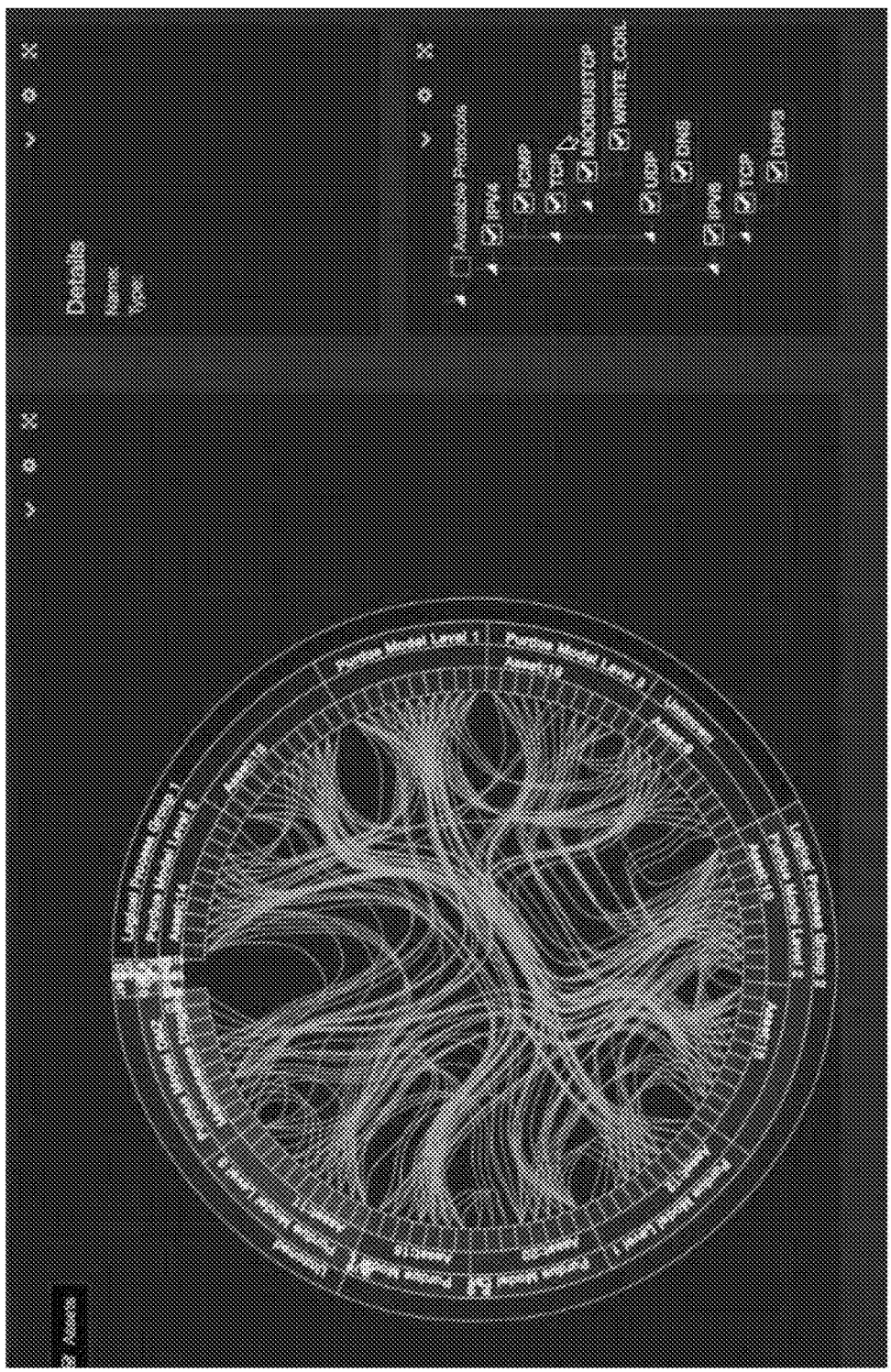
FIG. 11B depicts an example graphical user interface of a network orchestration and security platform application displaying a network flow diagram.

FIG. 11B depicts an example GUI of a network orchestration and security platform application displaying a network flow diagram. As illustrated in this implementation, the network flow diagram visualizes all communication flows or conversation links in the network using a hierarchical concentric ring architecture that divides each ring into sectors. In this implementation, the outermost ring is divided into sectors corresponding to security zones, the next ring is divided into sectors corresponding to asset conceptual level (e.g., level 1, 2, 3, of the Purdue Model), the next ring is divided into sectors corresponding to specific assets (e.g., PLC, SCADA, etc.), and the innermost ring is divided into sectors corresponding to a particular protocol/protocol behavior associated with an asset. For example, security zone 1 ("logical process group 1") includes under the Purdue Model Level 2 an asset number 14 that communicates using 10 different protocols/protocol behaviors. As would be appreciated by one having skill in the art, in some implementations, certain rings of the network flow diagram may be filtered from view.

In some implementations, a user may manually select an asset or protocol/protocol behavior (e.g., by clicking on the asset or protocol/protocol behavior of an asset) to bring up additional information. For example, selection of an asset may display the asset's type, flow rules associated with the asset, a security zone associated with the asset, whiteflow directives associated with asset, etc.

In some implementations, each of the protocols on the network flow diagram may be color coded to facilitate analysis of communications and conversation patterns on the network. In additional implementations, the flow diagram may be filtered by time period. For example, the flow diagram may show a real time view of conversations between assets or a filtered view of historical conversations between assets.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

What is claimed is:

1. A method comprising:
   generating a plurality of security zones in a network comprising a plurality of assets, wherein each of the plurality of security zones comprises a respective set of assets of the plurality of assets, wherein the plurality of security zones are generated based at least in part on a regularity of communications between assets of the plurality of assets and a type of protocol communication between assets of the plurality of assets;
   initializing an application comprising a graphical user interface for editing and visually representing the plurality of security zones of the network;
   displaying, on the graphical user interface, a visual representation of a first security zone of the plurality of security zones of the network, wherein the first security zone comprises a first set of assets of the plurality of assets;
   receiving data corresponding to user input at the graphical user interface editing the first security zone; and
   in response to receiving the data, editing the first security zone.

2. The method of claim 1 wherein the visual representation of the first security zone is a logical container of at least two or more of the plurality of assets.

3. The method of claim 2, wherein the network is an industrial network and wherein the plurality of assets comprises industrial devices.

4. The method of claim 3, wherein the network comprises a controller communicatively coupled to a plurality of forwarding devices, wherein each of the plurality of assets is communicatively coupled to a port of one of the plurality of forwarding devices, wherein the controller is configured to generate the plurality of security zones.

5. The method of claim 2, wherein the user input at the graphical user interface editing the first security zone comprises at least one of: moving a visual representation of one of the plurality of assets into the logical container of the first security zone or moving a visual representation of one of the assets from the logical container of the first security zone into a logical container of a second security zone of the network.

6. The method of claim 5, wherein the user input at the graphical user interface editing the first security zone comprises dragging a visual representation of an asset not assigned to a security zone into the logical container of the first security zone.

7. The method of claim 5, wherein the user input at the graphical user interface editing the first security zone comprises dragging a visual representation of one of the assets from the logical container of the first security zone into a logical container of a second security zone of the network.

8. A non-transitory computer-readable medium having instructions stored thereon that, when executed by a processor, causes a system to:
generate a plurality of security zones in a network comprising a plurality of assets, wherein each of the plurality of security zones comprises a respective set of assets of the plurality of assets, wherein the plurality of security zones are generated based at least in part on a regularity of communications between assets of the plurality of assets and a type of protocol communication between assets of the plurality of assets;
initialize an application comprising a graphical user interface for editing and visually representing the plurality of security zones of the network;
display, on the graphical user interface, a visual representation of a first security zone of the plurality of security zones of the network, wherein the first security zone comprises a first set of assets of the plurality of assets;
receive data corresponding to user input at the graphical user interface editing the first security zone; and
in response to receiving the data, editing the first security zone.

9. The non-transitory computer-readable medium of claim 8, wherein the visual representation of the first security zone is a logical container of at least two or more of the plurality of assets.

10. The non-transitory computer-readable medium of claim 9, wherein the network is an industrial network and wherein the plurality of assets comprises industrial devices.

11. The non-transitory computer-readable medium of claim 10, wherein the network comprises a controller communicatively coupled to a plurality of forwarding devices, wherein each of the plurality of assets is communicatively coupled to a port of one of the plurality of forwarding devices.

12. The non-transitory computer-readable medium of claim 9, wherein the user input at the graphical user interface editing the first security zone comprises at least one of: moving a visual representation of one of the plurality of assets into the logical container of the first security zone or moving a visual representation of one of the assets from the logical container of the first security zone into a logical container of a second security zone of the network.

13. The non-transitory computer-readable medium of claim 12, wherein the user input at the graphical user interface editing the first security zone comprises dragging a visual representation of an asset not assigned to a security zone into the logical container of the first security zone.

14. The non-transitory computer-readable medium of claim 12, wherein the user input at the graphical user interface editing the first security zone comprises dragging a visual representation of one of the assets from the logical container of the first security zone into a logical container of a second security zone of the network.

15. An industrial network system, comprising:
a controller;
a plurality of forwarding devices communicatively coupled to the controller over an industrial network;
a plurality of assets, wherein each of the plurality of assets is communicatively coupled to a port of one of the plurality of forwarding devices; and
a non-transitory computer-readable medium having instructions stored thereon that, when executed by a processor, causes the system to:
generate a plurality of security zones in the industrial network, wherein each of the plurality of security zones comprises a respective set of assets of the plurality of assets, wherein the plurality of security zones are generated based at least in part on a regularity of communications between assets of the plurality of assets and a type of protocol communication between assets of the plurality of assets;
initialize an application comprising a graphical user interface for editing and visually representing the plurality of the security zones of the industrial network;
display, on the graphical user interface, a visual representation of a first security zone of the plurality of security zones of the network, wherein the first security zone comprises a first set of assets of the plurality of assets;
receive data corresponding to user input at the graphical user interface editing the first security zone; and
in response to receiving the data, editing the first security zone.

16. The industrial network system of claim 15, wherein the visual representation of the first security zone is a logical container of at least two or more of the plurality of assets.

17. The industrial network system of claim 16, wherein the user input at the graphical user interface editing the first security zone comprises at least one of: moving a visual representation of one of the plurality of assets into the logical container of the first security zone or moving a visual representation of one of the assets from the logical container of the first security zone into a logical container of a second security zone of the network.

18. The industrial network system of claim 17, wherein the user input at the graphical user interface editing the first security zone comprises dragging a visual representation of an asset not assigned to a security zone into the logical container of the first security zone.

* * * * *